United States Patent [19]
Weng

[11] Patent Number: 5,831,349
[45] Date of Patent: Nov. 3, 1998

[54] AC TWO-WIRE SWITCH

[76] Inventor: Tianlu Weng, No. 322-6-401 Shenjialong Road, Pudong New Area, Shanghai, China

[21] Appl. No.: 794,406

[22] Filed: Feb. 3, 1997

[51] Int. Cl.$^6$ ....................................................... G05F 3/02
[52] U.S. Cl. ......................... 307/125; 307/126; 307/139; 327/447
[58] Field of Search ............................. 323/324; 327/447, 327/452, 453, 454, 455, 456; 307/112, 113, 116, 125, 126, 139, 140

[56] References Cited

U.S. PATENT DOCUMENTS 4,678,985   7/1987   Moskin ................................. 323/324

*Primary Examiner*—Jeffrey Gaffin
*Assistant Examiner*—Peter Ganjian

[57] ABSTRACT

An AC two-wire switch, comprising a pair of external terminals, a main circuit bidirectional switching module being connected between a pair of the external terminals, a control circuit for controlling action of the main circuit bidirectional switching module, and a self-generating power supply for providing the working power supply to the control circuit. The self-generating power supply includes a rectifying circuit, a voltage stabilizing circuit, a main circuit off-state feed circuit and at least one mutual inductor. According to this invention, the provided AC two-wire switch may greatly reduce the additional on-state voltage-drop and the additional off-state current, and furnish the best short-circuit protection and quick-acting overload protection.

21 Claims, 24 Drawing Sheets

AC TWO-WIRE SWITCH

BACKGROUND OF THE INVENTION

This invention relates to AC two-wire switches and more particularly to an AC two-wire switch using the mutual inductor for its regenerated power supply. This switch has only two external terminals to be connected to an AC circuit in series and applies to control on-off of the load.

Prior AC two-wire switches are mostly composed of electronic devices. On and off of the switch, that is, on and off of the operating current of the load depend on cut-in or cut-off of a module which is termed the main circuit bidirectional switching (MCBS) module. It is the same as other non-contact switches, because the MCBS module mainly consists of transistors or thyristors, the AC two-wire switch is possessed of the on-state voltage-drop and the off-state current result from the conduction voltage-drop and the cut-off leak current of the transistors or the thyristors. This on-state voltage-drop and this off-state current are termed the inherent on-state voltage-drop and the inherent off-state current respectively.

A control circuit exists in the AC two-wire switch with the control function. Here termed the regenerated power supply acts as the operating power supply of the control circuit. Differing from the internal power supply of non-two-wire switches, the regenerated power supply can not be directly generated from the AC power source through the conversion, but obtained from increasing the on-state voltage-drop and the off-state current of the AC two-wire switch. This increment of the on-state voltage and the off-state current are termed the additional on-state voltage-drop and the additional off-state current respectively.

The ways are different to produce the regenerated power supply in two states of the MCBS module. For the prior art, when the MCBS module is cut-off, the AC power source via the load and the rectifier produces the regenerated power supply, thus the additional off-state current is at least equal to the output current of the regenerated power supply. When the MCBS module is cut-in, it has two methods to produce the regenerated power supply in the prior art: the first is a Zener diode to be connected to the main circuit in series, to rely on the voltage across the Zener diode obtaining regenerated power supply; although this method can get stable regenerated power supply, the power dissipation in the Zener diode increases sharply under large current load; the second is that a thyristor is used in the main circuit and this thyristor is non-full-conduction state, the regenerated power supply is produced when the thyristor current enters a section of cut-off region after the zero-crossing, thus the distortion of the wave form of the load current is unavoidable. As the two methods mentioned above, the additional on-state voltage-drop is at least equal to the voltage of the regenerated power supply; if the regenerated power supply voltage is 5 volts, the additional on-state voltage-drop will be several times as much as the inherent on-state voltage-drop. Therefore, the additional on state voltage-drop and the additional off-state current, especially the additional on-state voltage-drop increases obviously compare with the inherent on-state voltage-drop result in the prior art has only a restricted application.

SUMMARY OF THE INVENTION

This invention overcomes the disadvantages of the prior art, pioneers a new development direction of the AC tow-wire switch, lays solid foundations for wide applications of this switch.

According to the invention, there is provided an AC two-wire switch comprising:
- a pair of external terminals means being connected to an AC circuit, this AC circuit including a load;
- an MCBS module means being connected between a pair of external terminals means for controlling cut-in and cut-off of the operating current of the load;
- a control circuit means being connected to the MCBS module means for controlling the MCBS module action; and
- at least a regenerated power supply means being connected to the power supply terminals of the control circuit means for providing the operating power supply of the control circuit, the regenerated power supply comprising a rectifying circuit, a voltage stabilizing circuit, a main circuit off-state feed circuit and at least a mutual inductor, the mutual inductor comprising at least a primary winding and at least a secondary winding, the primary winding and the MCBS module are tandem connection, the secondary winding being connected to the input terminals of the rectifying circuit.

According to the invention, the provided AC two-wire switch has several advantages as follows:
1. For using non-contact device in the MCBS module, this invention greatly reduces the additional off-state current and the additional on-state voltage-drop whose effect is even more striking under large current load compare with the prior art; for using contact device in the MCBS module, the tow-wire structures are completed to sacrifice the least additional on-state voltage-drop.
2. The attached overcurrent signal can easily establish the best short-circuit protection and quick-acting overload protection.
3. This switch is able to work under the non-sine wave power source.
4. Several regenerated power supplies may be produced in an AC two-wire switch to suit various control circuits and control forms.
5. The voltage applicable range of the AC power source is enlarged further in some projects of using the current stabilizing component.
6. Since the mutual inductor is used and the positive feedback is formed, the transit time is extremely short from start conduction to full conduction for the MCBS module so that its power dissipation is reduced in the course of the conduction.

DETAILED DESCRIPTION

The invention will be detailed description with reference to the drawings and the embodiments as shown in the following.

Figure 1:
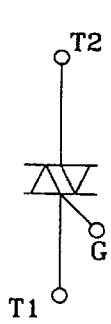
FIG. 1 to FIG. 12 show twelve circuit diagrams of twelve main circuit bidirectional switching modules of this invention.
Figure 2:
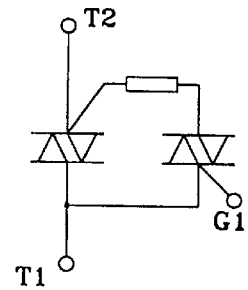
Figure 3:
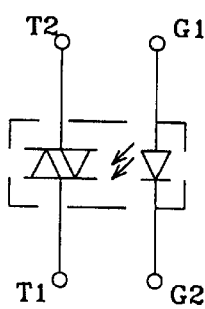
Figure 4:
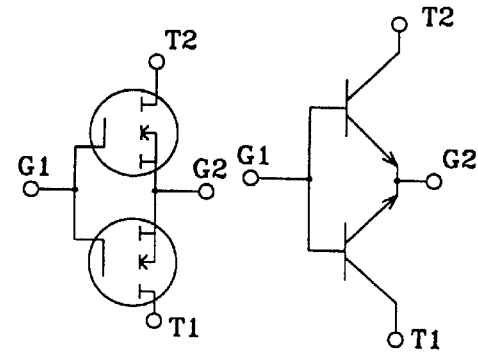
Figure 5:
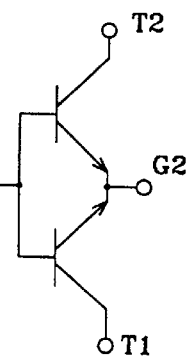
Figure 6:
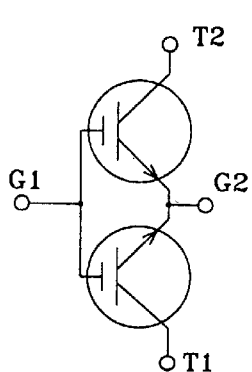
Figure 7:
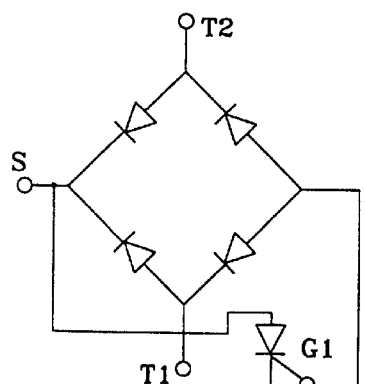
Figure 8:
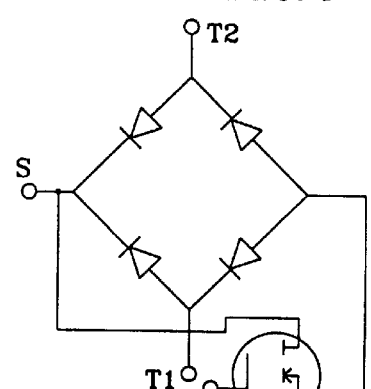
Figure 9:
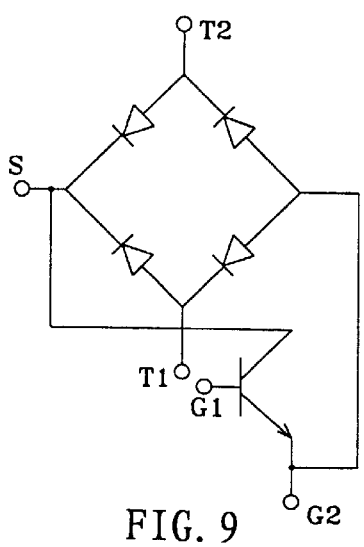
Figure 10:
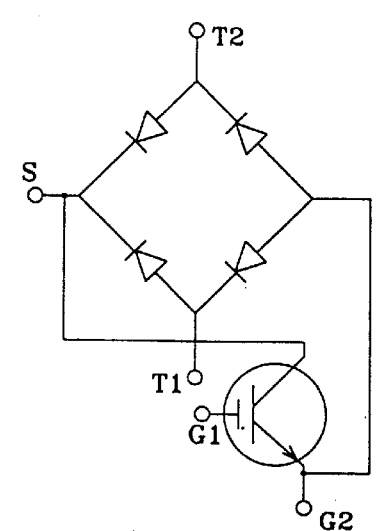
Figure 11:
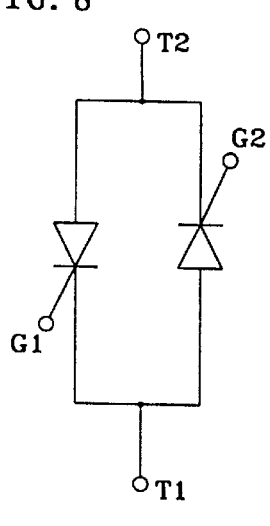
Figure 12:
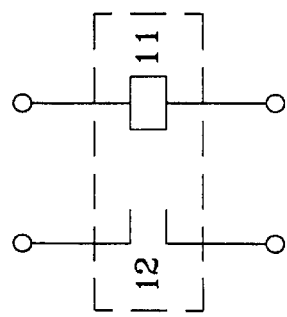

In the circuit diagram of FIG. 1, the main circuit bidirectional switching module is a bidirectional thyristor and has two main electrode terminals T1,T2 and a control electrode terminal G1; the control signal should be entered between the terminal G1 and the terminal T1. In FIG. 2, the MCBS module consists of two bidirectional thyristor and a resistor; it has two main electrode terminals T1, T2 and a control electrode terminal G1; the control signal should be entered between the terminal G1 and terminal T1, In FIG. 3 the MCBS module consists of a light emitting diode and a bidirectional photoelectric thyristor; it has two main electrode terminals T1, T2 and two control electrode terminals G1, G2; the control signal should be entered between the terminal G1 and the terminal G2. In FIG. 4, the MCBS module consists of two VMOS FETs. In FIG. 5, the MCBS module consists of two bipolar transistors. In FIG. 6, the MCBS module consists of two IGBTs. In FIG. 4 to FIG. 6, all the MCBS modules have two main electrode terminals T1, T2 and two control electrode terminals G1, G2; all the control signals should be entered between the terminal G1 and the terminal G2. In FIG. 7, the MCBS module consists of a unidirectional thyristor and four diodes. In FIG. 8, the MCBS module consists of a VOMS and four diodes. In FIG. 9, the MCBS module consists of a bipolar transistor and four diodes. In FIG. 10, the MCBS module consists of a IGBT and four diodes. In FIG. 7 to FIG. 10, all the MCBS modules have two main electrode terminals T1,T2 and two control electrode terminals G1,G2 and a start terminal S; all the control signals should be entered between the terminal G1 and the terminal G2. In FIG. 11 the MCBS module consists of two unidirectional thyristors; it has two main electrode terminal T1, T2 and two control electrode terminals G1,G2; this MCBS module requires two synchronous control signals entered between the terminal G1 and the terminal T1 and between the terminal G2 and the terminal T2 respectively. In FIG. 12, the MCBS module is a mechano-electric relay which having a coil and a pair of normally open contacts; the control signal should be entered between two terminals of the coil.

Figure 13:
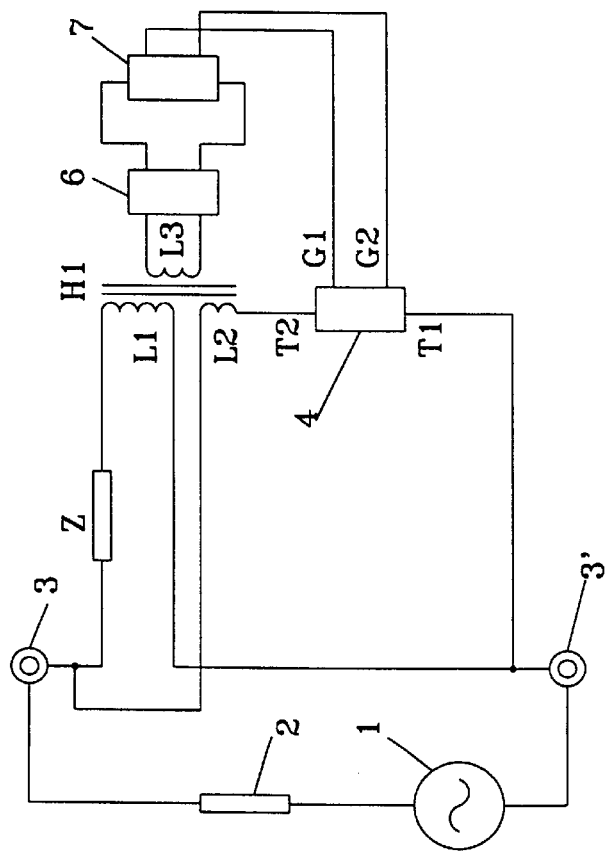

FIG. 13 shows a block diagram of first project of this invention. In FIG. 13, terminal 3 and terminal 3' are two external terminals of this AC two-wire switch, they and the AC power source 1 and the load 2 are tandem connection. The regenerated power supply consists of the mutual inductor H1, the rectifying and voltage stabilizing circuit 6 and the impedance element Z. The mutual inductor H1 has three windings: second primary winding L1, first primary winding L2 and first secondary winding L3. The winding L1 and the element Z in series compose a main circuit off-state feed circuit and are connected to the terminal 3 and the terminal 3'. One terminal of the winding L2 is connected to the terminal T2 (or T1) of the MCBS module 4, another terminal of the winding L2 and the terminal T1 (or T2) are connected to the terminal 3 and the terminal 3' respectively. The winding L3 is connected to the input terminals of the rectifying and voltage stabilizing circuit 6. The output voltage of the circuit 6 is the very voltage of the regenerated power supply, it is used as the operating power supply of the control circuit 7; therefore, the output terminals of the circuit 6 are connected to the power supply terminals of the control circuit 7. The output terminals of the control circuit 7 are connected to the control electrode terminal G1 and G2 of the MCBS module 4, the control signal of the output of the control circuit 7 via the terminal G1 and G2 controls cut-in and cut-off of the MCBS module 4. In FIG. 13, the MCBS module 4 may use any one as shown in FIG. 1 to FIG. 10; because the MCBS module as shown in FIG. 1 and FIG. 2 has not the terminal G2, if they are used, the lead wires which may be connected to the terminal G2 should be connected to the terminal T1.

For the circuit in FIG. 13, to produce the regenerated power supply has two ways. When the MCBS module 4 is cut-off, certain current exists in the winding L1 because the winding L1 and the element Z, the load 2, the AC power source 1 form a loop; this current is the very additional off-state current; it acts as the primary input current of the mutual inductor H1 so the induced voltage across the secondary winding L3 is used as the regenerated power supply by rectifying and voltage stabilizing; on the other hand, its effect may be neglect that only a cut-off leak current of the transistor or the thyristor exists in the winding L2. When the MCBS module 4 is cut-in, because the flowing is the operating current of the load 2 in the primary winding L2, similarly the induced voltage across the secondary winding L3 is used as the regenerated power supply by rectifying and voltage stabilizing; at this time, because the winding L1 and L2 are two primary windings in parallel with each other through different impedance and the impedance on the path of the winding L1 is very large relatively, flowing current is very small in the winding L1 and its effect may be neglect actually. In FIG. 13, the additional on-state voltage-drop is the voltage across the winding L2 when the MCBS module 4 is cut-in.

For the circuit in FIG. 13, the regenerated power supply has solved the feed of the control circuit 7 within this AC two-wire switch, thereupon, it may control on-off of the load 2 according to the control mode of the control circuit 7.

Figure 14:
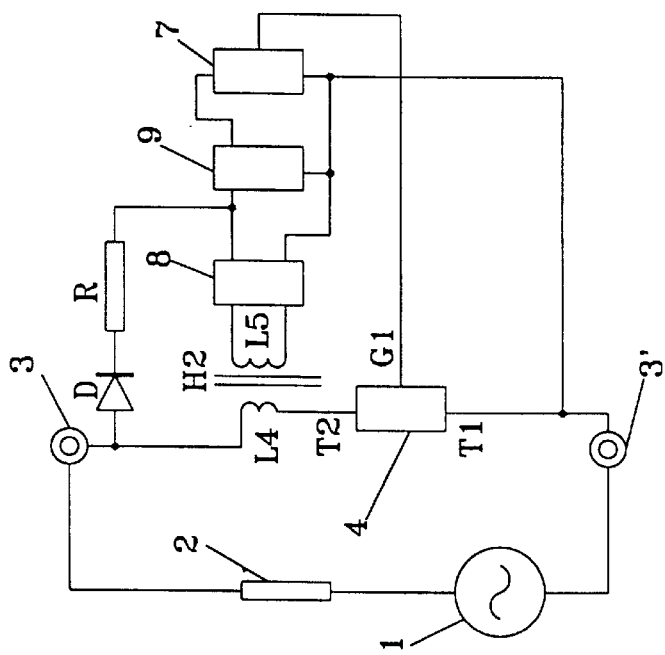
FIG. 13 to FIG. 32 show twenty block diagrams from first project to twentieth project of this invention.

FIG. 14 shows a block diagram of second project of this invention. In FIG. 14, terminal 3 and terminal 3' are two external terminals of this AC two-wire switch, they and the AC power source 1 and the load 2 are tandem connection. The regenerated power supply consists of the mutual inductor H2, the rectifying circuit 8, the voltage stabilizing circuit 9, and the main circuit off-state feed circuit which consists of the diode D and the resistor R in series. The mutual inductor H2 has two windings: the primary winding L4 and the secondary winding L5. One terminal of the winding L4 is connected to the main electrode terminal T2 of the MCBS module 4; another terminal of the winding L4, the terminal 3 and one terminal of the series circuit which consists of the diode D and the resistor R are interconnected; another terminal of said series circuit, one terminal of the output of the rectifying circuit 8 and one terminal of the input of the voltage stabilizing circuit 9 are interconnected; another terminal of the output of the rectifying circuit 8, the common reference node of the voltage stabilizing circuit 9, the common reference node of the control circuit 7, the main electrode terminal T1 and the terminal 3' are interconnected. The winding L5 is connected to the input terminals of the rectifying circuit 8. The output voltage of the voltage stabilizing circuit 9 is the very voltage of the regenerated power supply, it is used as the power supply of control circuit 7 so the output terminals of the voltage stabilizing circuit 9 are connected to the power supply terminals of the control circuit 7. The output terminal of the control circuit 7 is connected to the control electrode terminal G1 of the MCBS module 4. The control signal which changes against the common bus via the terminal G1 controls cut-in and cut-off of the MCBS module 4. In FIG. 14, the MCBS module 4 may use any one as shown in FIG. 1 and FIG. 10.

For the circuit in FIG. 14, the regenerated power supply to be produce has two ways: when the MCBS module 4 is cut-off, the AC power source 1 and the load 2, the diode D, the resistor R and two terminals of the output of the rectifying circuit 8 form a loop that produces a DC voltage across two terminals of the output of the circuit 8, this voltage via the voltage stabilizing circuit 9 is used as the regenerated power supply; when the MCBS module 4 is cut-in, the flowing is the operating current of the load 2 in the winding L4, it acts as the primary input current of the mutual inductor H2 so the induced voltage across the secondary winding L5 via rectifying and voltage stabilizing is used as the regenerated power supply. In FIG. 14, the additional on-state voltage-drop is the voltage across the winding L4 when the MCBS module is cut-in; the additional off-state current is half-wave current in the diode D when the MCBS module is cut-off.

For the circuit in FIG. 14, the regenerated power supply has solved the feed of the control circuit 7 within this AC two-wire switch, thereupon, it may control on-off of the load 2 according to the control mode of the control circuit 7.

Figure 15:
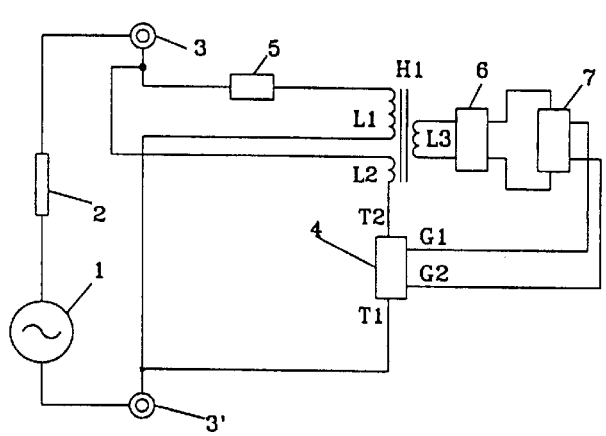
Figure 32:
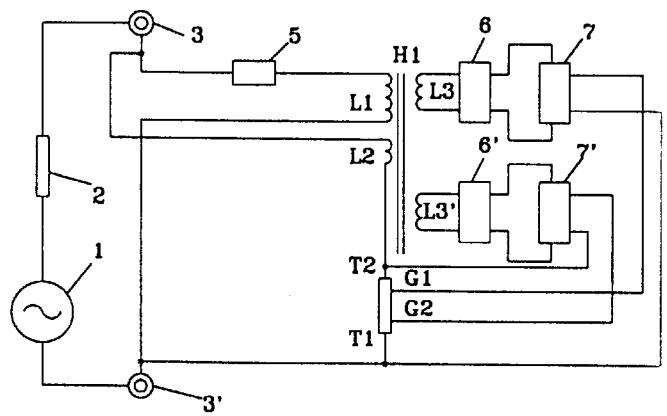
Figure 33:
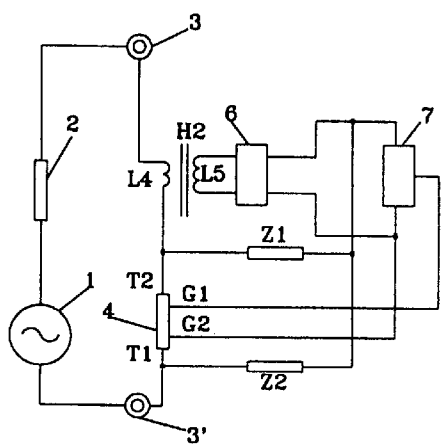
FIG. 33 shows another block diagram of third project of this invention.

FIG. 15 and FIG. 33 show two block diagrams of third project of this invention. FIG. 16 to FIG. 32 show seventeen block diagrams from fourth project to twentieth project of this invention.

In FIG. 15 to FIG. 33, the terminal 3 and 3' are two external terminals of these AC two-wire switches, they and the AC power source 1 and the load 2 are tandem connection. In these two-wire switches, every regenerated power supply consisted of the mutual inductor H1 or H2, the rectifying circuit 8 and the voltage stabilizing circuit 9 or the rectifying and voltage stabilizing circuit 6, and the main circuit off-state feed circuit which via the AC power source 1 and the load 2 produces the regenerated power supply when the main circuit is off-state.

Figure 25:
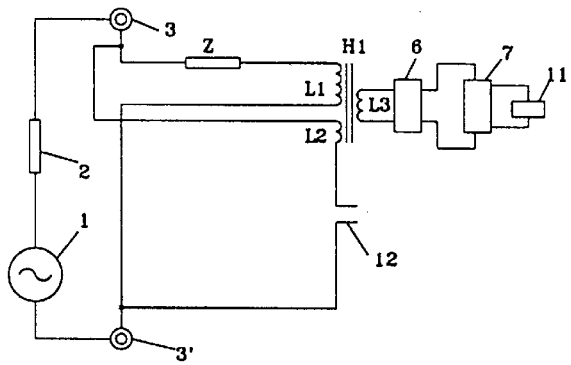
Figure 26:
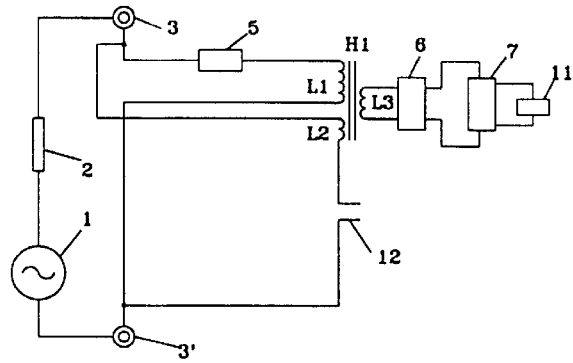

In FIG. 15, FIG. 25 and FIG. 26, the mutual inductor H1 has three windings: second primary winding L1, first primary winding L2 and first secondary winding L3. The winding L1, and the impedance element Z or the bidirectional current stabilizing component 5 in series compose a main circuit off-state feed circuit and are connected to the terminal 3 and 3'. The winding L2 via two main electrode terminals T1, T2 or the normally open contacts 12 of the mechano-electric relay is connected to the terminal 3 and 3'. The winding L3 is connected to the input terminals of the rectifying and voltage stabilizing circuit 6. The output voltage of the rectifying and voltage stabilizing circuit 6 is the very voltage of the regenerated power supply and is used as the power supply of the control circuit 7, therefore, the output terminals of the rectifying and voltage stabilizing circuit 6 are connected to the power supply terminals of the control circuit 7. The output terminals of the control circuit 7 are connected to two control electrode terminals G1, G2 or the coil 11 of the mechano-electric relay. The control signal of the output of the control circuit 7 via the terminal G1 and G2 or the coil 11 controls cut-in and cut-off of the MCBS module 4.

In FIG. 15, the MCBS module 4 may use any one as shown in FIG. 1 to FIG. 11, because the MCBS module as shown in FIG. 1 and FIG. 2 has not the terminal G2, if they are used, the lead wires which may be connected to the terminal G2 should be connected to the terminal T1; if used as shown in FIG. 11, it should supplement the second secondary winding L3', the second rectifying and voltage stabilizing circuit 6' and the second control circuit 7' as shown in FIG. 33 so that the output terminals of two control circuits 7 and 7' are connected to the terminal G1, T1 and the terminal G2, T2 respectively and two synchronous control signals are used to control cut-in and cut-off of the MCBS module. Of course, for the circuit in FIG. 13, the MCBS module 4 also may use as shown in FIG. 11 similarly as mentioned above.

In FIG. 16 to FIG. 24 and in FIG. 27 to FIG. 32, the same aspects in circuit configuration are as follows: the mutual inductor H2 has two windings, the primary winding L4 and the secondary winding L5; one terminal of the winding L4 is connected to the main electrode terminal T2 of the MCBS module 4 or one contact of the pair of normally open contacts 12, another terminal of the winding L4 is connected to the terminal 3, the main electrode terminal T1 or another contact of the pair of normally open contacts 12 is connected to the terminal 3'; the winding L5 is connected to the input terminals of the rectifying circuit 8 or the rectifying and voltage stabilizing circuit 6; the output terminals of the rectifying circuit 8 are connected to the input terminals of the stabilizing circuit 9; the output voltage of the voltage stabilizing circuit 9 or the rectifying and voltage stabilizing circuit 6 is the voltage of the regenerated power supply and is used as the power supply of the control circuit 7, therefore, the output terminals of the circuit 9 or the circuit 6 are connected to the power supply terminals of the control circuit 7; the output terminals of the control circuit 7 are connected to the control electrode terminal G1 and G2 or the terminal G1 and the main electrode terminal T1 or the coil 11; the control signal of the output of the control circuit 7 via the terminal G1, G2 or the terminal G1, T1 or the coil 11 controls cut-in and cut-off of the MCBS module 4.

Figure 16:
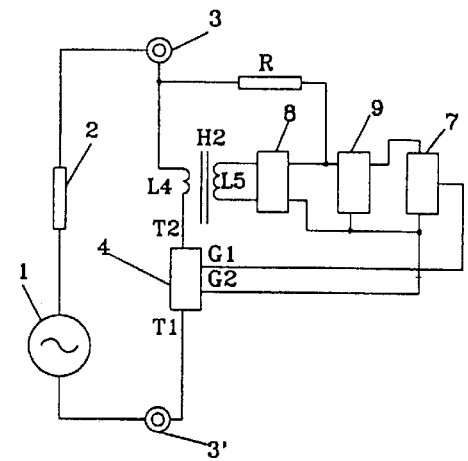
Figure 17:
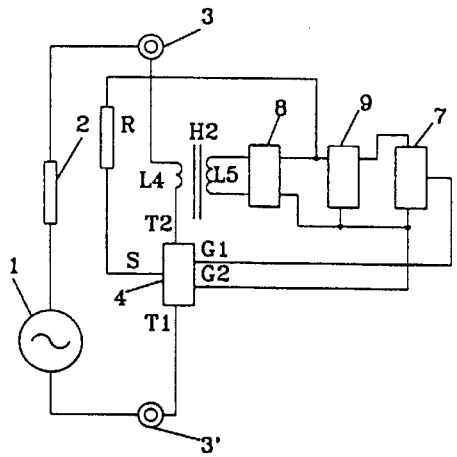
Figure 18:
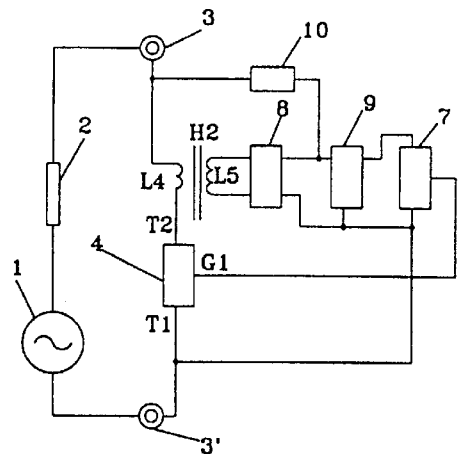
Figure 19:
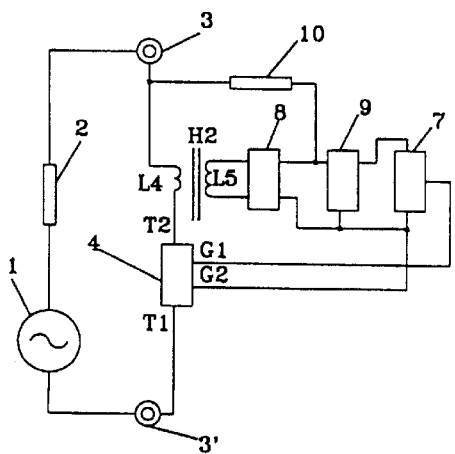
Figure 20:
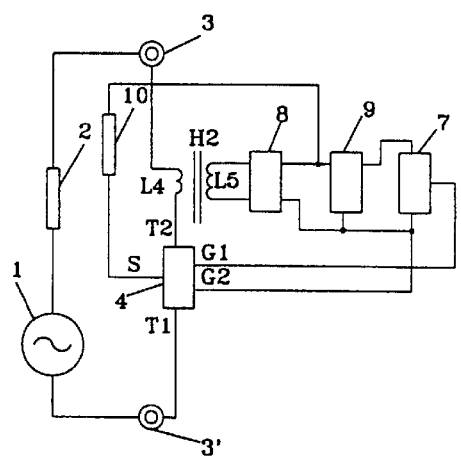
Figure 21:
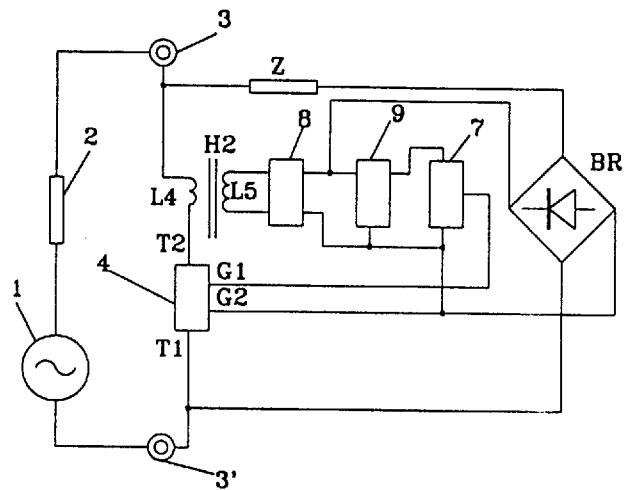
Figure 22:
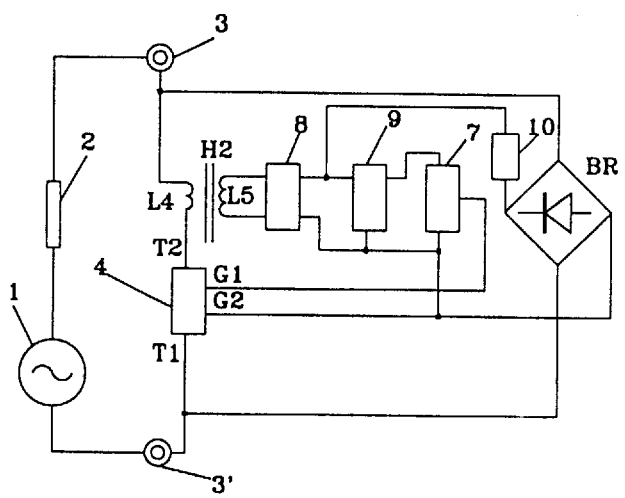
Figure 23:
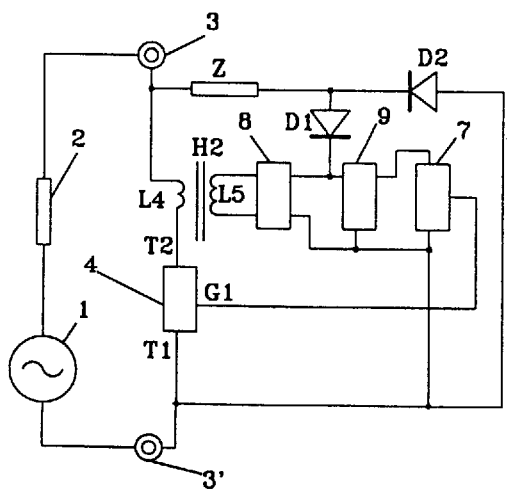
Figure 24:
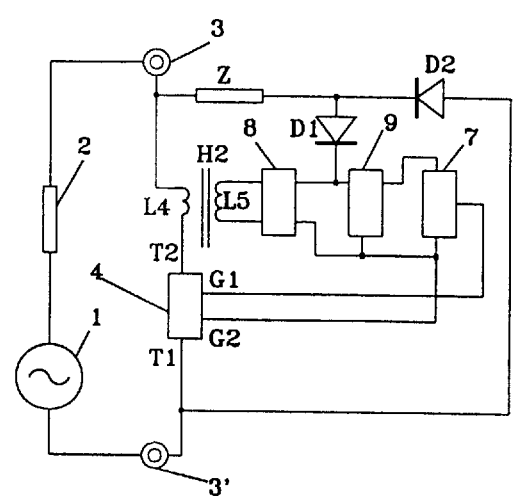

In FIG. 16 to FIG. 24 and in FIG. 32, the different aspects in circuit configuration are as follows: in FIG. 18 and FIG. 23, one terminal of the output of the rectifying circuit 8, the common reference node of the voltage stabilizing circuit 9, the common reference node of the control circuit 7 and the main electrode terminal T1 are interconnected; in FIG. 16 and in FIG. 17 and in FIG. 19 to FIG. 22 and in FIG. 24, one terminal of the output of the rectifying circuit 8, the common reference node of the voltage stabilizing circuit 9, the common reference node of the control circuit 7 and the control electrode terminal G2 are interconnected; for the circuits in FIG. 16 to FIG. 24, another terminal of the output of the rectifying circuit 8, via the resistor R is connected to the terminal 3 in FIG. 16; via the resistor R is connected to the start terminal S of the MCBS module 4 in FIG. 17; via the unidirectional current stabilizing component 10 is connected to the terminal 3 in FIG. 18 and FIG. 19; via the component 10 is connected to the start terminal S in FIG. 20; is connected to one terminal of the output of the bridging rectifying circuit BR in FIG. 21, another terminal of the output of this circuit BR is connected to the terminal G2, two terminals of input of this circuit BR via the impedance element Z are connected to the terminal 3 and 3'; via the component 10 is connected to one terminal of the output of the bridging rectifying circuit BR in FIG. 22, another terminal of the output of this circuit BR is connected to the terminal G2, two terminals of the input of this circuit BR are connected to the terminal 3 and 3' respectively; is connected to the negative terminal of first diode D1 in FIG. 23 and FIG.

24, the positive terminal of first diode D1 and the negative terminal of second diode D2 and one terminal of the impedance element Z are interconnected, another terminal of this element Z is connected to the terminal 3, the positive terminal of second diode D2 is connected to the terminal 3'. For the circuit in FIG. 32, one terminal of the output of the rectifying and voltage stabilizing circuit 6 and the common reference node of the control circuit 7 and the control electrode terminal G2 are interconnected; another terminal of the output of this circuit 6 and one terminal of first impedance element Z1 and one terminal of second impedance element Z2 are interconnected; another terminal of the element Z1 is connected to the main electrode terminal T2; another terminal of the element Z2 is connected to main electrode terminal T1.

Figure 27:
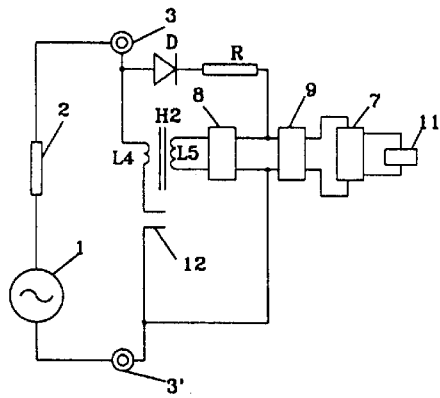
Figure 28:
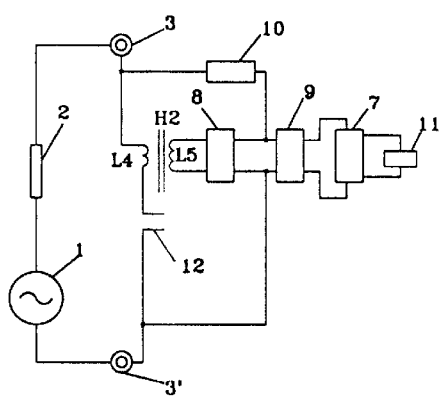
Figure 29:
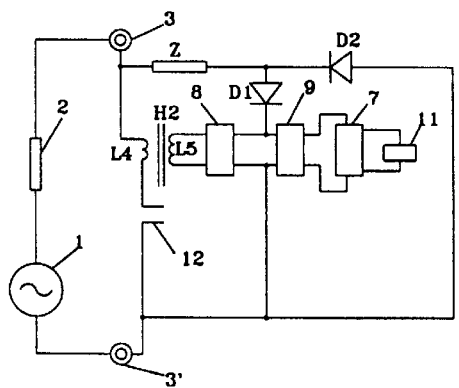
Figure 30:
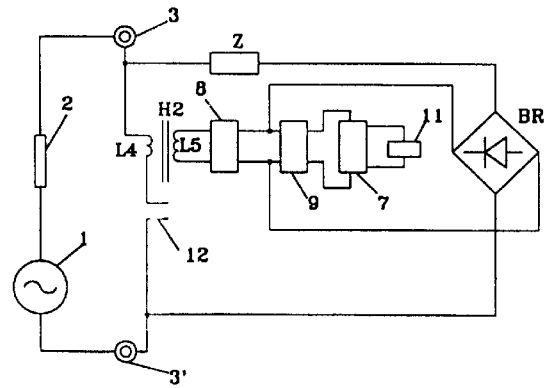
Figure 31:
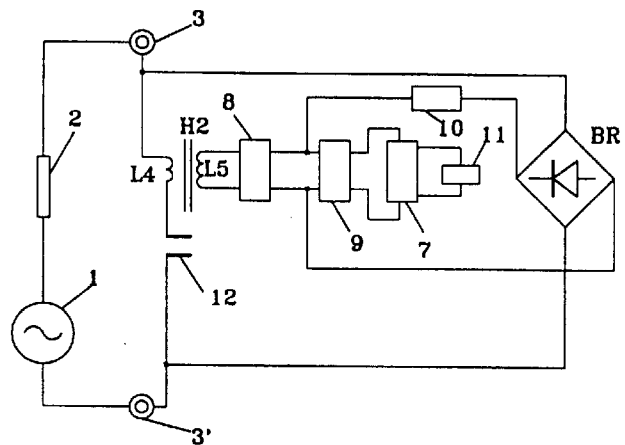

In FIG. 27 to FIG. 31, the different aspects in circuit configuration are as follows: two terminals of the output of the rectifying circuit 8 are connected to two terminals of input of the voltage stabilizing circuit 9 respectively and, via the resistor R and the diode D in series are connected to the terminal 3 and 3' in FIG. 27; via the unidirectional current stabilizing component 10 are connected to the terminal 3 and 3' in FIG. 28; one of the terminals is connected to the negative terminal of first diode D1 in FIG. 29, another and the positive terminal of second diode D2 and the terminal 3' are interconnected, the positive terminal of first diode D1 and the negative terminal of second diode D2 and one terminal of the impedance element Z are interconnected, another terminal of this element Z is connected to the terminal 3; are connected to two terminals of the output of the bridging rectifying circuit BR respectively in FIG. 30, two terminal of the input of this circuit BR via the impedance element Z are connected to the terminal 3 and 3'; via the unidirectional current stabilizing component 10 are connected to two terminals of the output of the bridging rectifying circuit BR in FIG. 31, two terminals of the input of this circuit BR are connected to the terminals 3 and 3' respectively.

For the circuits in FIG. 16 to FIG. 24 and in FIG. 27 to FIG. 32, the main circuit off-state feed circuit consists of, the resistor R in FIG. 16 and in FIG. 17; the unidirectional current stabilizing component 10 in FIG. 18 to FIG. 20 and in FIG. 28; the bridging rectifying circuit BR and the impedance element Z in FIG. 21 and in FIG. 30; the bridging rectifying circuit BR and the unidirectional current stabilizing component 10 in FIG. 22 and in FIG. 31; first diode D1 and second diode D2 and the impedance element Z in FIG. 23 and in FIG. 24 and in FIG. 29; the diode D and the resistor R in FIG. 27; first impedance element Z1 and second impedance element Z2 in FIG. 32.

In FIG. 16, FIG. 19, FIG. 24 and FIG. 32, the MCBS module 4 may use any one as shown FIG. 4 to FIG. 10. In FIG. 17 and FIG. 20, the MCBS module 4 may use any one as shown FIG. 7 to FIG. 10. In FIG. 18 and FIG. 23, the MCBS module 4 may use any one as shown FIG. 1 to FIG. 3, if used as shown FIG. 3, the terminal G2 and the terminal T1 should be interconnected. In FIG. 21 and FIG. 22, the MCBS module 4 may use any one as shown FIG. 3 to FIG. 10.

For the circuits in FIG. 15 to FIG. 32, when the MCBS module is cut-in, the ways to produce the regenerated power supply is the same: because the load operating current exists in the primary winding L2 or the primary winding L4, the induced voltage across the secondary winding L3 or L5 via rectifying and voltage stabilizing is used as the regenerated power supply. In FIG. 15 to FIG. 32, when the MCBS module is cut-off, although all the regenerated power supplies are produced by the AC power source 1 via the load 2 and the main circuit off-state feed circuit, every detail is different. In FIG. 15, FIG. 25 and FIG. 26, because the AC power source 1 via the load 2, the element Z or the component 5 and the winding L1 form a loop, a certain current exists in the winding L1 and this current is the primary input current of the mutual inductor H1 so the induced voltage across the secondary winding L3 by rectifying and voltage stabilizing is used as the regenerated power supply. In FIG. 16 to FIG. 24 and in FIG. 27 to FIG. 31, a DC voltage between two terminals of the output of the rectifying circuit 8 is formed at first, this DC voltage then by voltage stabilizing is used as the regenerated power supply. This DC voltage, in FIG. 16 and FIG. 19, is formed by the AC power source 1 via the load 2, the resistor R or the component 10 and the unidirectional conduction passage between the terminal G2 and the terminal T1 (for the MCBS module in FIG. 7 to FIG. 10, between the control electrode terminal G2 and the main electrode terminal T1 there is the unidirectional conduction diode; for the MCBS module in FIG. 4 to FIG. 6, between the terminal G2 and the terminal T1, there is the drain electrode and the source of the VMOS FET whose gate electrode has no positive bias voltage; or is the collector and the emitter of the bipolar transistor whose base has no poured current, so there is a unidirectional conduction passage similarly); in FIG. 17 and FIG. 20, is formed by the AC power source 1 via the load 2, the bridging rectifying circuit in the MCBS module, and the resistor R or the component 10; in FIG. 18, FIG. 27 and FIG. 28, is formed by the AC power source 1 via the load 2, the diode D and the resistor R or the component 10; in FIG. 21, FIG. 22, FIG. 30 and FIG. 31, is formed by the AC power source 1 via the load 2, the bridging rectifying circuit BR and the element Z or the component 10; in FIG. 23 and FIG. 29, is formed by the AC power source 1 via the load 2, the element Z and first diode D1, here the function of second diode D2 is to offer an AC passage for the capacitive impedance; in FIG. 24, is formed by the AC power source 1 via the load 2, the element Z, first diode D1 and the unidirectional conduction passage between the terminal G2 and the terminal T1. In FIG. 32, when the MCBS module 4 is cut-off, and while positive half-wave or negative half-wave of the AC power source 1, the AC power source 1, via first impedance element Z1 and a unidirectional conduction passage between the terminal G2 and the terminal T1, or via second impedance element Z2 and a unidirectional conduction passage between the terminal G2 and the terminal T2 forms a DC voltage between two terminals of the output of the rectifying and voltage stabilizing circuit 6, this DC voltage is used as the regenerated power supply.

For the circuits in FIG. 15 to FIG. 32, when the MCBS module is cut-in, the additional on-state voltage-drop is the AC voltage-drop across the winding L2 or the winding L4; when the MCBS module is cut-off, the additional off-state current, in FIG. 15, FIG. 25 and FIG. 26, is the AC current in the winding L1; in FIG. 16, FIG. 18, FIG. 19, FIG. 27 and FIG. 28, is the half-wave current in the resistor R or the component 10; in FIG. 21, FIG. 23, FIG. 24, FIG. 29 and FIG. 30, is the AC current in the impedance element Z; in FIG. 22 and FIG. 31, is the AC current which flows into the input terminal of the bridging rectifying circuit BR; in FIG. 17 and FIG. 20, is the increment of the AC current which flows into the input terminal of the bridging rectifying circuit in the MCBS module 4, and the increment is caused by the current in the resistor R or the component 10; in FIG. 32, is the increment of the AC current in the winding L4 that is caused by the element Z1 and the element Z2.

For the circuits in FIG. 15 to FIG. 32, the regenerated power supply has solved the feed of the control circuit within the AC two-wire switch, thereupon, it may control on-off of the load 2 according to the control mode of the control circuit 7.

The parameters of the mutual inductor H1 and H2 are determined according to the design of protection-used mutual inductor. For the mutual inductor H1, the winding L1 and L2 are two primary windings, the winding L3 is a secondary winding. The primary input current in the winding L2 is the operating current of the load 2. The current in the winding L1 may be changed by way of modifying the impedance element Z value and property or the current stabilizing value of the bidirectional current stabilizing component 5. If the capacity requirements of the regenerated power supply are alike under two states of the main circuit, the ampere-turns of the winding L1 and L2 should be nearly equal. The secondary output voltage value across the winding L3 is determined should according to the capacity requirement and the voltage value of the regenerated power supply and the form of the rectifying and voltage stabilizing circuit. For the mutual inductor H2, the winding L4 is a primary winding and the winding L5 is a secondary winding. The primary input current in the winding is the operating current of the load 2. The secondary output voltage value across the winding L5 is determined such as above mentioned.

FIG. 34 to FIG. 61 show the detailed circuit diagrams of the preferred embodiments of this invention. Herein, except for FIG. 37, the terminal 3 and 3' are two external terminals of the AC two-wire switch of this invention, two external terminals and the AC power source 1 and the load 2 are tandem connection.

Figure 34:
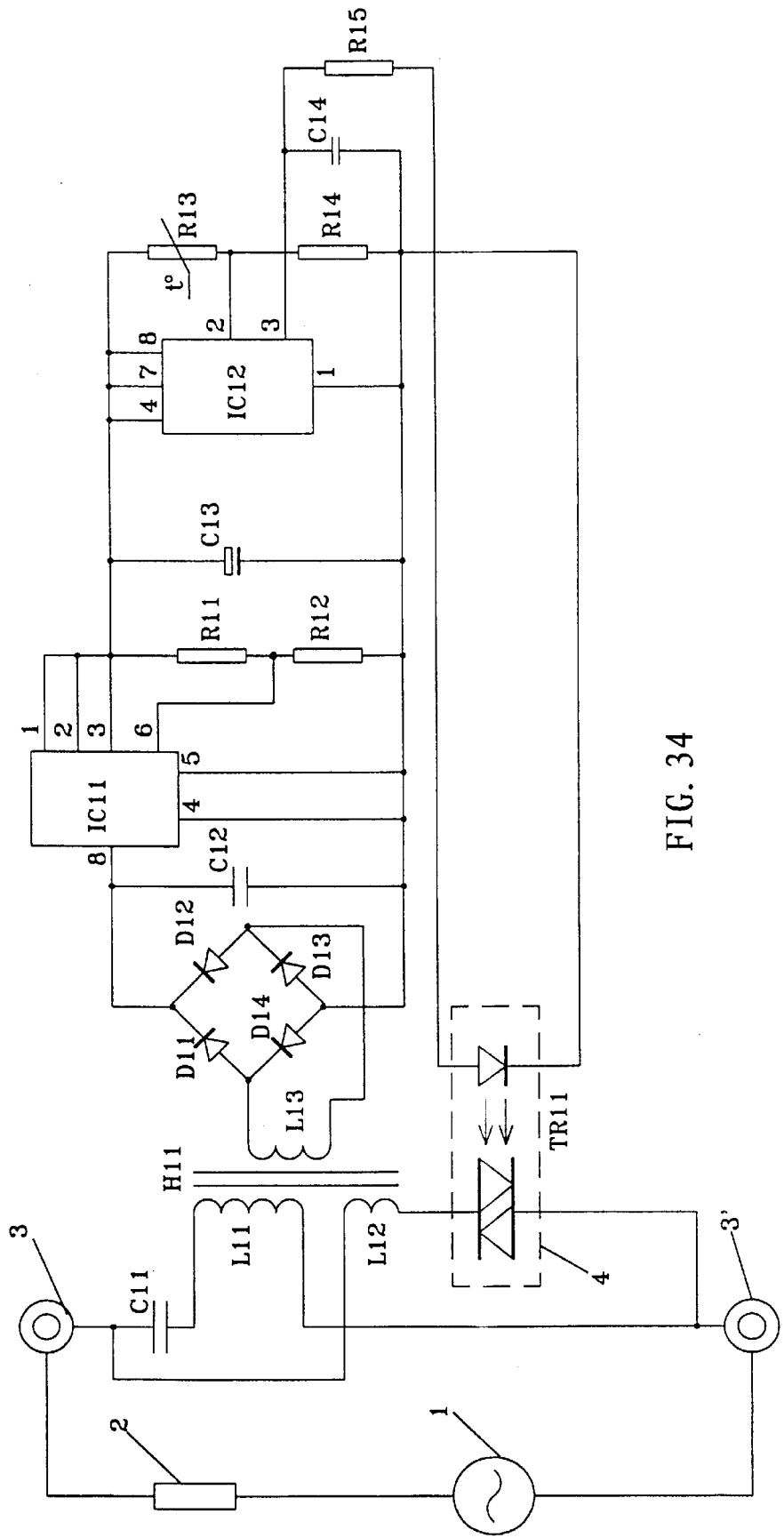
FIG. 34 to FIG. 37 show the detailed circuit diagrams of four preferred embodiments of first project of this invention.

FIG. 34 shows a detailed circuit diagram of first preferred embodiment of first project of this invention. This is a two-wire temperature control switch. The AC power source 1 voltage is 220 volts, 50 hertzs. The load 2 is a heater of which the current is 1 ampere. The mutual inductor H11 corresponding, with the mutual inductor H1 in FIG. 13. The MCBS module uses a form as shown FIG. 3. The rectifying and voltage stabilizing circuit consists of four diode D11 to D13, the integrated circuit IC11 and the outer-periphery elements. The control circuit consists of the circuit IC12 and the outer-periphery elements. R13 is a gradual change negative temperature coefficient thermistor. When the cooling resistance value of the thermistor R13 increases to 30 kilo-ohms, third pin of the circuit IC12 becomes high level, thus the photoelectric bidirectional thyristor in the photoelectric coupler TR11 conduct on and the heater 2 is turned on, When the heating resistance value of the thermistor R13 reduces to 7.5 Kilo-ohms, third pin of the circuit IC12 is low level, thus the thyristor is cut-off and the heater 2 is turned off.

In FIG. 34, expect for the thermistor R13, datum of other elements show as follows:
H11 Piece of core
XE6-D310-0.2-B SJ97-65 (Thickness 12.5 m/m)
XI6-D310-0.2-B SJ97-65 (Thickness 12.5 m/m)

| winding | Turns | wire outer diameter (m/m) |
|---|---|---|
| L11 | 5500 | 0.03 |
| L12 | 30 | 0.50 |
| L13 | 1000 | 0.13 |

IC11=CW7663; IC12=LM555; TR11=SP1100;
D11 to D14=1N4001; C11=0.1 µF; C12=0.047 µF;
C13=22 µF; C14=0.01 µF; R11=300K Ω;
R12=100K Ω; R14=15K Ω; R15=300 Ω.

In FIG. 34, when load current is 1 ampere, the additional on-state voltage-drop is 0.4 volt and the additional off-state current is 5 milliamperes; they are greatly decrease compare with the prior art. The feature of this two-wire switch is to realize electric isolation between the sensor (here is the thermistor) and the AC power source.

Figure 35:
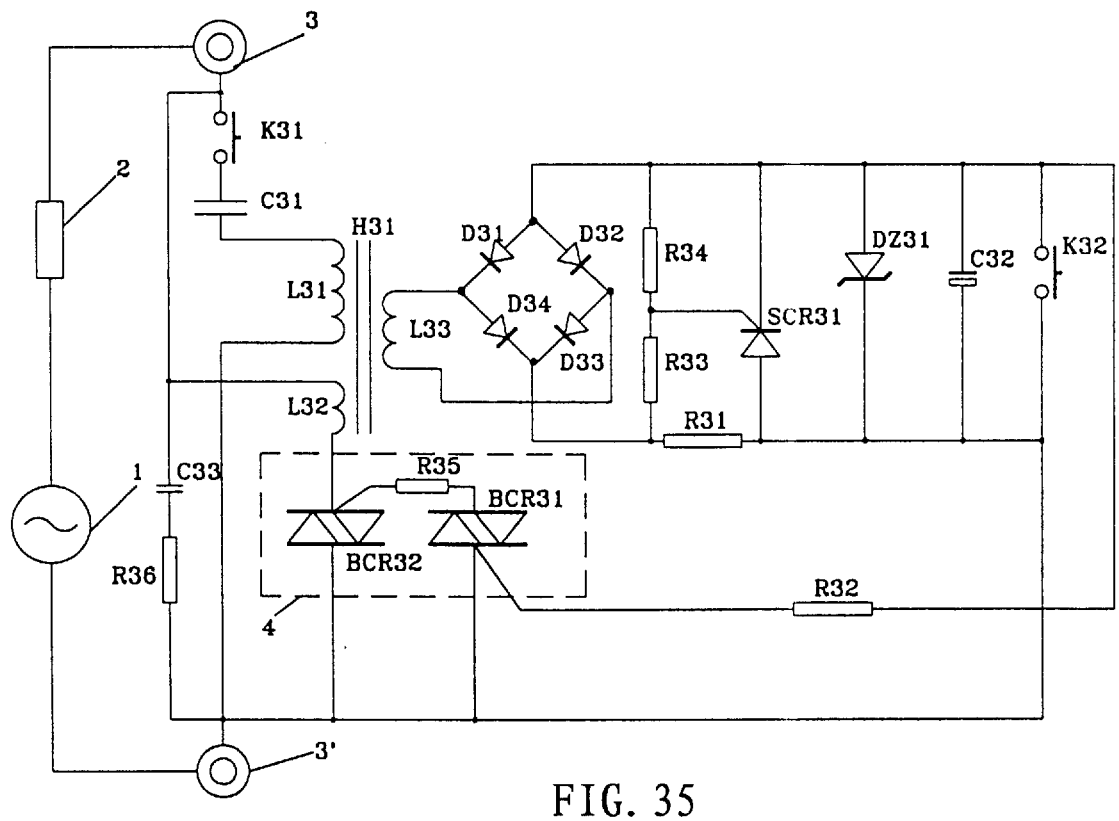

FIG. 35 shows a detailed circuit diagram of second preferred embodiment of first project of this invention. This is a large current two-wire protection switch depends on two buttons to control on-off of load 2. Its feature is that there is no additional off-state current when the load 2 is turned off. The applicable range of the AC power source 1 is 100 volts to 250 volts, 50 hertzs. The allowable change range of the load current is 5 amperes to 25 amperes. The mutual inductor H31 corresponding with the mutual inductor H1 in FIG. 13 and the capacitor C31 corresponding with the impedance element Z in FIG. 13. The rectifying circuit consists of four diode D31 to D34. The voltage stabilizing circuit consist of the resistor R31, the diode DZ31 and the capacitor C32. The MCBS module uses a form as shown FIG. 2. The control circuit consists of two buttons K31 and K32, the resistors R32, R33, R34 and a thyristor SCR 31. Concrete operating process shows as follows: after the button K31 is pushed down, the regenerated power supply which is established depend on the current in the winding L31 via the resistor R32 triggers the thyristor BCR31 so the thyristor BCR31 and BCR32 conduct on and the load 2 is cut-in,. After the thyristor BCR32 is cut-in, the regenerated power supply depends on the load current in the wining L32 so the button K31 need not push down. If want to turn off the load 2 since then, pushing down the button K32 only, thus the regenerated power supply is short-circuited so that the thyristor BCR31 and BCR32 are cut-off and the load 2 is turned off. If the load current exceeds rating (26 amperes) when the load 2 is cut-in, the output voltage of the rectifying circuit will increase and this voltage makes the thyristor SCR31 conduction through the voltage divider R33 and R34, thus the thyristor BCR31 and BCR32 will be cut-off so the overload protection is completed.

In FIG. 35, datum of the elements show as follows:
H31 Piece of core
XE6-D310-0.2-B SJ97-65 (Thickness 12.5 m/m)
XI6-D310-0.2-B SJ97-65 (Thickness 12.5 m/m)

| Winding | Turns | Wire outer diameter (m/m) |
|---|---|---|
| L31 | 3000 | 0.03 |
| L32 | 2 | 2.50 |
| L33 | 800 | 0.13 |

BCR31=TLC386A; BCR32=BTA26-700;
SCR31=CR02AM-1; DZ31=2CW53;
D31 to D34=1N4001; C31=0.22 µF;
C32=22 µF; C33=0.15 µF; R31=30 Ω;
R32=150 Ω; R33=4.7K Ω; R34=91K Ω;
R35=100 Ω; R36=82 Ω.

In FIG. 35, the additional on-state voltage-drop is under 0.05 volt when the load current is 20 amperes. It shows that the reducing effect of the additional on-state voltage-drop is even more remarkable under large load current for this invention.

Figure 36:
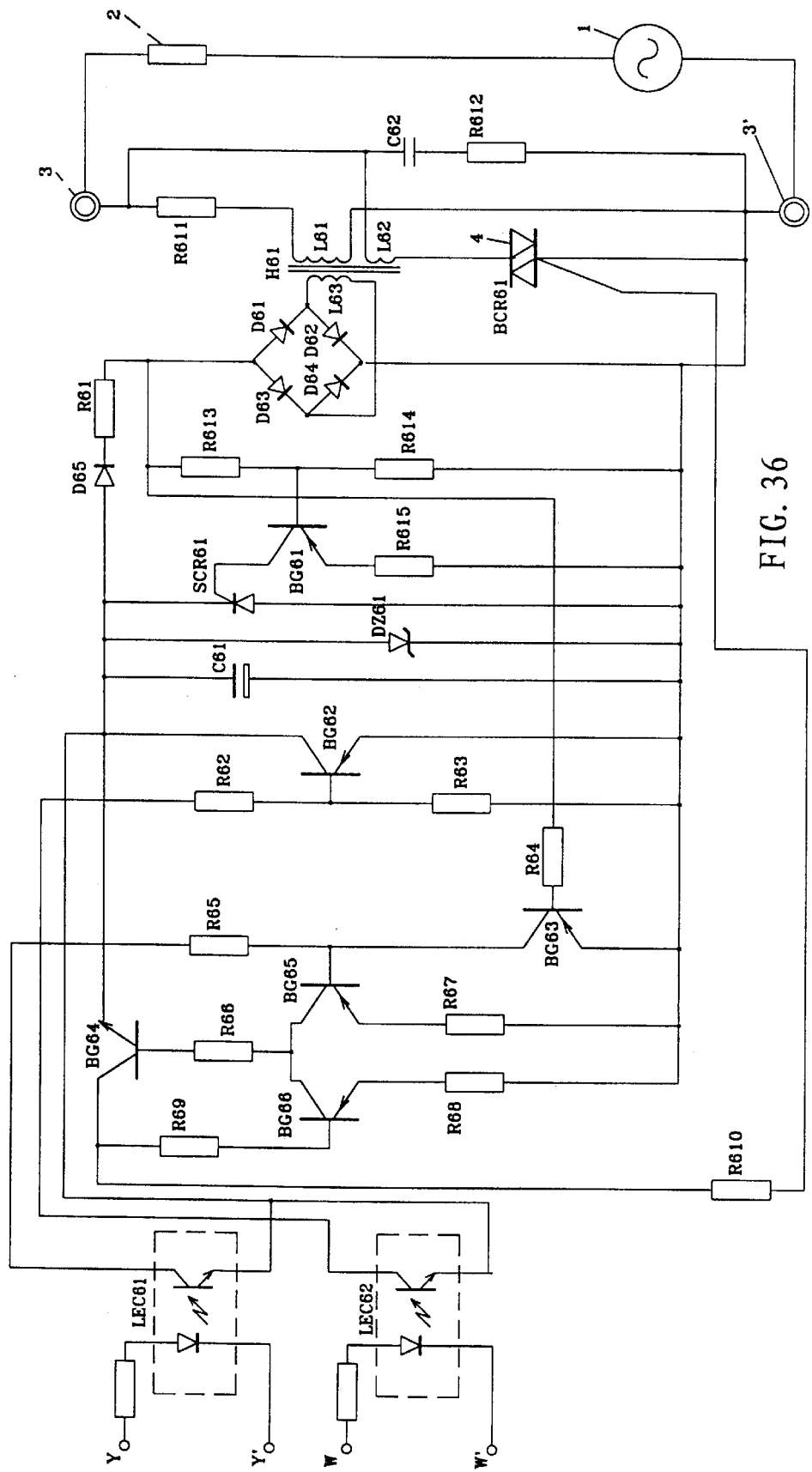

FIG. 36 shows a detailed circuit diagram of third preferred embodiment of first project of this invention. This is an AC solid state relay with overload protection using the triggering pulse control zero-cross on-off. The applicable range of the AC power source 1 is 100 volts to 250 volts, 50 hertzs. The allowable change range of the load current is 0.8 ampere to 3 amperes. The mutual inductor H61 corresponding with the mutual inductor H1 in FIG. 13. The resistor R611 corresponding with the impedance element Z in FIG. 13. The rectifying and voltage stabilizing circuit consists of five diodes D61 to D65, the Zener diode DZ61, the resistor R61 and the capacitor C61. The control circuit comprising three parts: the first has zero-cross on function using triggering pulse control and consists of the photoelectric coupler LEC61, four transistors BG63 to BG66 and the outer-periphery elements; the second has zero-cross off function using triggering pulse control and consists of the photoelectric couple LEC62, the transistor BG62, two resistor R62 and R63; the third has overload protection function and consists of the thyristor SCR61, the transistor BG61, three resistor R63, R614 and R615. The MCBS module uses a form as shown in FIG. 1. How operation of this relay shows as follows: when the thyristor BCR61 is cut-off, the zero-cross moments of the sine pulsating voltage of the output of the rectifying circuit and the voltage of the AC power source 1 are the same approximately because the phase of this sine pulsating voltage may be adjust through changing the parameter of the mutual inductor H61 and the resistance value of the resistor R611; this pulsating voltage makes the transistor BG63 having pulsating base current via the resistor R64. When the input terminals Y and Y' of the photoelectric coupler LEC61 are put in a pulse of which the width is more than 10 milliseconds, the internal photoelectric transistor of the coupler LEC61 conducts on so the regenerated power supply via this photoelectric transistor and the resistor R65 put in the collector of the transistor BG63 and the base of the transistor BG65. At this time, the base current of the transistor BG65 depends on conduction condition of the transistor BG63, therefore, only at the zero-cross nearby of the said sine pulsating voltage, the transistor BG63 is cut-off and the transistor BG65 and BG64 can conduct on, thus the thyristor BCR61 is triggered conduction and the load 2 is electrified. After the transistor BG64 is conduction, its collector voltage through the resistor R69 pours into ba se current towards the transistor BG66 and makes the transistor BG66 conduction, therefore, after the pulse between the terminals Y and Y' disappears, the transistor BG64 remains conduction and the load 2 remains cut-in. When the input terminals W and W' of the photoelectric coupler LEC62 are put in a pulse, the internal photoelectric transistor of the coupler LEC62 turns conduction and makes the transistor BG62 conduction, hence the voltage of regenerated power supply decreases greatly so that the transistor BG64 is cut-off and the thyristor BCR61 turns cut-off at the zero-cross, and the load and 2 is turned off. When the load 2 is cut-in and the load current exceeds rating, the output voltage of the rectifying circuit will increase and makes the transistor BG61 and the thyristor SCR61 turn on ,thus the regenerated power supply is short-circuited so the transistor BG64 and the thyristor BCR61 is cut-off, and the load 2 is tuned off. That is overload protection function.

In FIG. 36, datum of the elements show as follows:
H61 Piece of core
XE6-D310-0.2-B SJ97-65 (Thickness 12.5 m/m)
XI6-D310-0.2-B SJ97-65 (Thickness 12.5 m/m)

| Winding | Turns | Wire outer diameter (m/m) |
|---|---|---|
| L61 | 3000 | 0.03 |
| L62 | 20 | 0.63 |
| L63 | 1000 | 0.13 |

BCR61=TLC386A; SCR61=CR02AM-1;
D61 to D65=1N4001; DZ61=2CW54;

BG61, BG62, BG63=9012; BG64=9013;
BG65, BG66=9012; LEC61, LEC62=GD-10;
C61=22 $\mu$F; C62=0.1 $\mu$F;
R61=47 $\Omega$; R62=4.7K $\Omega$; R63=4.7K $\Omega$;
R64=10K $\Omega$; R65=100K $\Omega$; R66=3.6K $\Omega$;
R67=2K $\Omega$; R68=2K $\Omega$; R69=47K $\Omega$;
R610=150 $\Omega$; R611=8.2K $\Omega$; R612=100 $\Omega$;
R613=2K $\Omega$; R614=470 $\Omega$; R615=10K $\Omega$.

Figure 37:
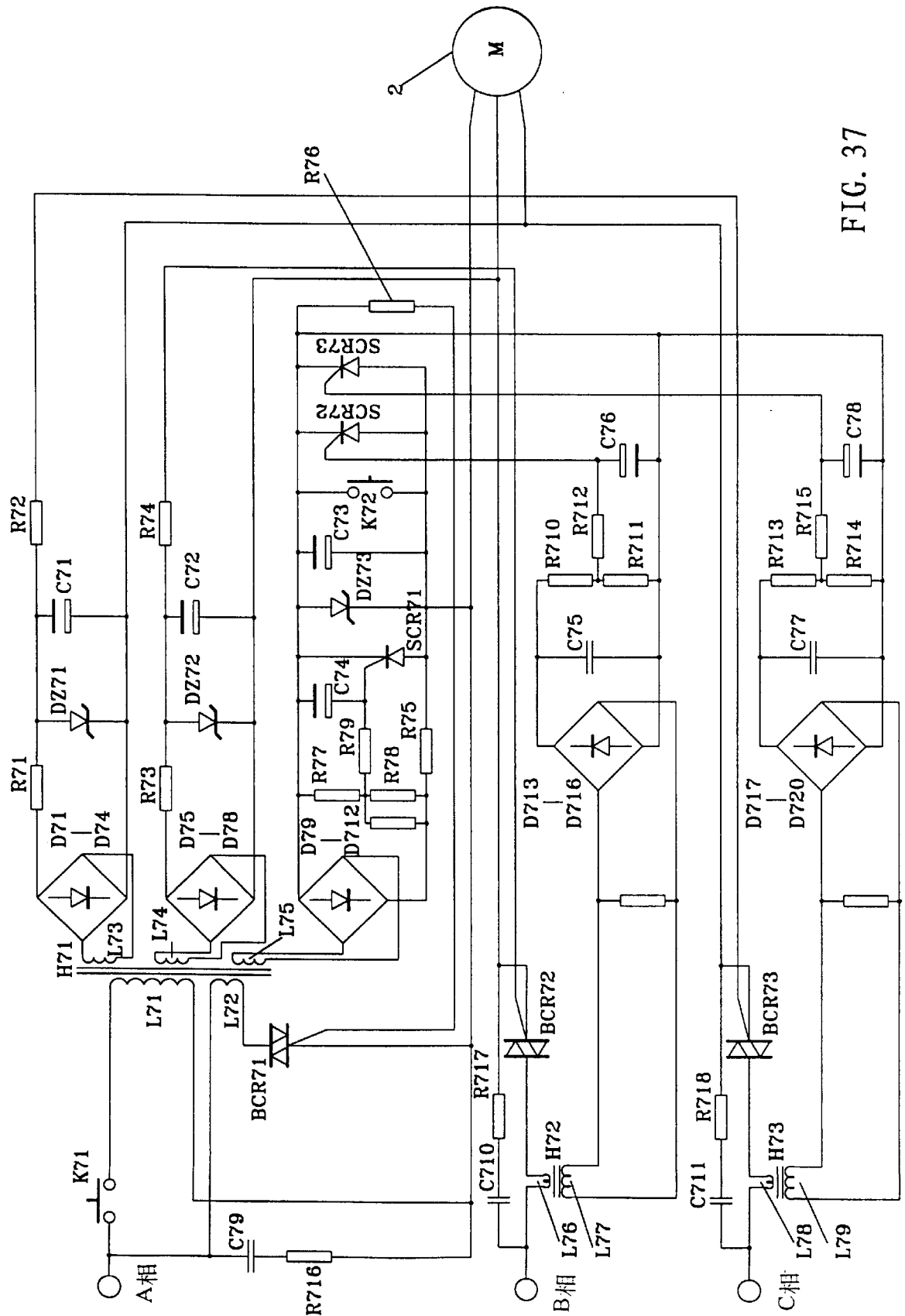

FIG. 37 shows a detailed circuit diagram of fourth preferred embodiment of first project of the invention. This is a two-wire form three phases protection switch using two buttons control on-off of the three phases load. The AC power source is three phases 380 volts, 50 hertzs. The terminal A,B and C are connected to correspondent the three phases power source respectively. The load is a three phases motor (type J32-2). The feature of this switch is that the passages between the three phases will be isolated after disconnecting the three phases load whether this switch is connected to the three phases power source or not. Because some circuit configuration and how operation of this switch is similar to the said mentions, selective description shows as follows: the mutual inductor H71 has three secondary windings L73, L74 and L75, their output voltages by rectifying and voltage stabilizing form three regenerated power supplies which trigger the thyristor BCR71, BCR72 and BCR73 via the resistor R72, R74 and R76 respectively. When the thyristor BCR71 is cut-off and the button K71 is pushed down, A phase power source via the winding L71, the three phases motor, the overvoltage protection component (the capacitor C710 and the resistor R717) and B phase power source form a loop; on the other hand, A phase power source via the winding L71, the three phases motor, the overvoltage protection component (the capacitor C711 and the resistor R718) and C phase power source form a loop, thus to rely on the current in the winding L71 obtains three regenerated power supplies. When the thyristor BCR71 is conduction, to rely on A phase load current in the winding L72 obtains three regenerated power sources. The mutual inductor H72 and H73 is used only as overload protection, their overload signals across the winding L77 and L79 by rectifying, dividing voltage and delay trigger the thyristor SCR72 and SCR73 respectively; that the thyristor SCR71 to be triggered is similar to the thyristor SCR72 and SCR73, therefore, when overcurrent of any one phase or the three phases motor stopping rotation, the three phases main circuit will be turned off together. This switch may be easily added to the broken phase protection and the overheat protection, also may chance into the sensor controlling the there phases load.

In FIG. 37, datum of the elements show as follows:
H71 Piece of core
KE10-D310-0.35-Y SJ98-65 (Thickness 10 m/m)
KI10-D310-0.35-Y SJ98-65 (Thickness 10 m/m)

| Winding | Turns | Wire outer diameter (m/m) |
|---|---|---|
| L71 | 3000 | 0.07 |
| L72 | 20 | 0.63 |
| L73, L74 | 700 | 0.13 |
| L75 | 800 | 0.13 |

H72,H73 Piece of core
XE6-D310-0.2-B SJ97-65 (Thickness 12.5 m/m)
XI6-D310-0.2-B SJ97-65 (Thickness 12.5 m/m)

| Winding | Turns | Wire outer diameter (m/m) |
|---|---|---|
| L76, L78 | 15 | 0.50 |
| L77, L79 | 1500 | 0.13 |

BCR71 to BCR73=BTA06-700;
SCR71 to SCR73=CR02AM-1;
D71 to D720=1N4001; DZ71 to DZ73=2CW54;
C71 to C73=22 $\mu$F; C74, C76, C78=47 $\mu$F;
C75, C77=0.47 $\mu$F; C79=0.1 $\mu$F;
C710, C711=0.22 $\mu$F; R71, R73, R75=30 $\Omega$;
R72, R74, R76=100 $\Omega$; R77, R710, R713=4.7K $\Omega$;
R78, R711, R714=1K $\Omega$;
R79, R712, R715=20K $\Omega$;
R716, R717, R718=100 $\Omega$.

Figure 38:
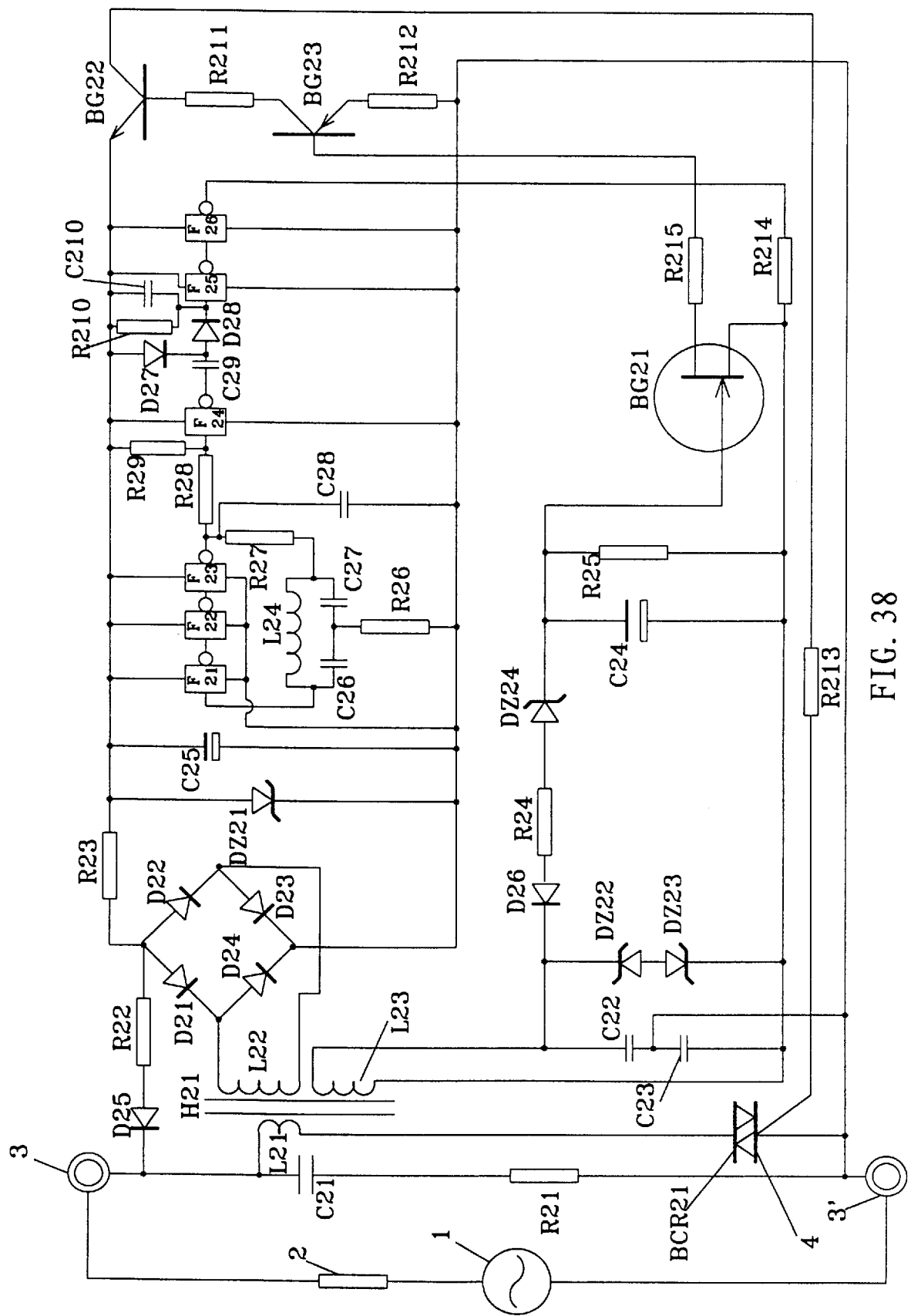

FIG. 38 shows a detailed circuit diagram of first preferred embodiment of second project of this invention. This is a HF oscillation type two-wire proximity switch with overload protection. The applicable range of the AC power source 1 is 100 volts to 250 volts, 50 hertzs. The applicable range of the load current is 0.8 ampere to 3 amperes. The winding L21 in the mutual inductor H21 corresponding with the winding L4 in FIG. 14; the winding L22 corresponding with the winding L5 in FIG. 14; the winding L23 is a supplemental secondary winding for overload protection. The diode D25 and the resistor R22 corresponding with the diode D and the resistor R in FIG. 14. The rectifying circuit consists of four diode D21 to D24. The voltage stabilizing consists of the resistor R23, the Zener diode DZ21 and the capacitor C25. The control circuit consists of six NOT gates, three transistors BG21, BG22,BG23, the winding L23 and the outer-periphery elements. The MCBS module uses a form as shown FIG. 1.

Operating process of this proximity switch shows as follows: when the metal probe leaves far the sensory coil L24, the HF oscillator which comprises three NOT gates F21, F22 and F23 is oscillation; the output signal of the NOT gate F26 can not make the transistor BG22 and BG23 conduction ,thus the thyristor BCR21 is cut-off and the load 2 maintains off. When the metal probe approaches to the sensory coil L24 and enters into effective distance, the HF oscillator ceases oscillation; the output signal of the NOT gate F26 via the JFET BG21 causes the transistor BG22 and BG23 conduction so the thyristor BCR21 is turned on and the load 2 is cut-in. When the load current exceeds rating, the voltage across the winding L123 increases, thus the voltage across the capacitor C24 increases and the JFET BG21 becomes cut-off, therefore, the transistor BG22 and BG23 from conduction changes into cut-off ,thus the thyristor BCR21 becomes cut-off and the load 2 is turned off. Afterwards the capacitor C24 discharge pass the resistor R25 and the voltage across it decreases gradually; when this voltage reduces to the open voltage of the JFET BG21, the JFET BG21 becomes conduction so the thyristor BCR21 conducts on and the load 2 is turned on; that is automatic reset. If the overload cause has been removed since then, the load 2 will be on all along; if the overload cause is remained, the load 2 will be off again after short-lived cut-in.

In FIG. 38, datum of the elements show as follows:
H21 Piece of core
XE6-D310-0.2-B SJ 97-65 (Thickness 10 m/m)
XI6-D310-0.2-B SJ 97-65 (Thickness 10 m/m)

| Winding | Turns | Wire outer diameter (m/m) |
|---|---|---|
| L21 | 18 | 0.08 |
| L22 | 1000 | 0.13 |
| L23 | 500 | 0.13 |

L24 MX-2000 ferrite core (type G22B); turns 200; Wire outer diameter 0.1 m/m.
F21 to F26=5C003; BCR21=TLC386A;
BG21=3DJ9I; BG22=9013;
BG23=9012; D21 to D24=1N4001;
D25=1N4007; D26=1N4001;
D27, D28=1N4148; DZ21=2CW53;
DZ22, DZ23=2CW51; DZ24=2CW52;
C21, C22, C23=0.1 $\mu$F; C24=100 $\mu$F;
C25=22 $\mu$F; C26, C27, C28=5100PF;
C29=3300PF; C210=2200PF;
R21=100 $\Omega$; R22=10K $\Omega$; R23=30 $\Omega$;
R24=1K $\Omega$; R25=100K $\Omega$; R26=100 $\Omega$;
R27=5.1K $\Omega$; R28=51K $\Omega$; R29=51K $\Omega$;
R210=150K $\Omega$; R211=3.6K $\Omega$; R212=2K $\Omega$;
R213=150 $\Omega$; R214=10K $\Omega$; R215=10K $\Omega$.

In FIG. 38, the additional on-state voltage-drop is 0.2 volt when the load current is 2.5 amperes; the additional off-state current (average value) is 10 milliamperes when the AC power source is 220 volts. The overload protection acts when the load current exceeding 3 amperes. The time of automatic reset is 30 seconds; it may be set up anew by changing the resistor R25.

Figure 39:
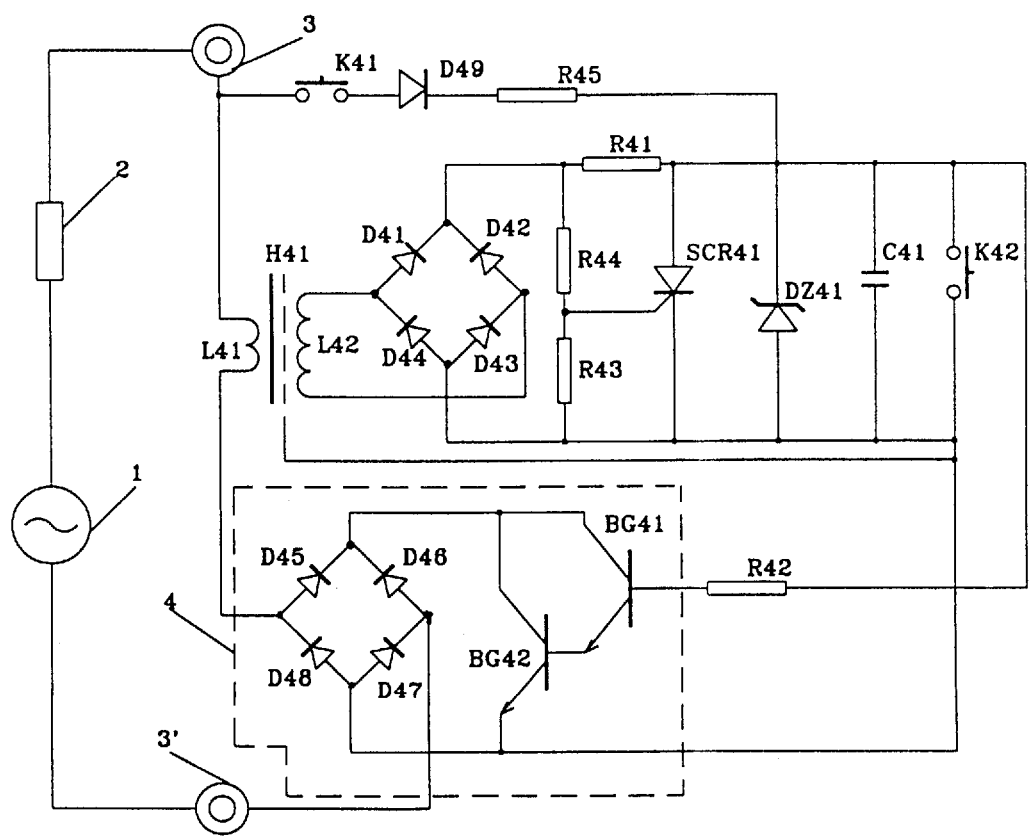
FIG. 38 to FIG. 40 show the detailed circuit diagrams of three preferred embodiments of second project of this invention.

FIG. 39 shows a detailed circuit diagram of second preferred embodiment of second project of this invention. This is a two-wire protection switch which applies to audio and superaudible frequency and relies on two buttons control on-off. The frequency of the AC power source 1 is 3K hertzs and 25K hertzs; the wave form is the bidirectional square wave; the amplitude is 100 volts. The load is a resistor; the load current amplitude is 1 ampere. The mutual inductor H41 corresponding with the mutual inductor H2 in FIG. 14; the diode D49 and the resistor R45 corresponding with the diode D and the resistor R in FIG. 14. The rectifying circuit consists of four diodes D41 to D44. The voltage stabilizing circuit consists of the resistor R41, the Zener diode DZ41 and the capacitor C41. The control circuit consists of the button K41, K42, the resistor R42, R43, R44, the thyristor SCR41. The MCBS module uses a form as shown FIG. 9. Operating process of this switch is similar to the circuit in FIG. 35, therefore, both the same parts are no longer narrated repeatedly, different respect has two points: the first is that the AC power source 1 via the load2, the diode D49, the resistor R45 and the Zener diode DZ41 establishes the regenerated power supply at the Zener diode DZ41 when the transistor BG41 and BG42 are cut-off and the button K41 is pushed down. The second is that the regenerated power supply via the resistor R42 pours into the base current to the transistor BG41 and makes the Darington to maintain conduction when the load is electrified.

In FIG. 39, datum of the elements show as follows:
H41 (under 3K hertzs) (L42 add to metal shield)
Core: MX2000 circle ferrite core (standards 13*7*5)

| Winding | Turns | Wire outer diameter (m/m) |
| --- | --- | --- |
| L41 | 10 | 0.50 |
| L42 | 250 | 0.13 |

H41 (under 25K hertzs) (L42 add to metal shield)
Core: MX2000 circle ferrite core (standards 10*6*5)

| Winding | Turns | Wire outer diameter (m/m) |
| --- | --- | --- |
| L41 | 2 | 0.50 |
| L42 | 38 | 0.13 |

BG41=D1571; BG42=SDK1300;
SCR41=CR02AM-1; DZ41=2CW53;
D41 to D44=1N4148; D45 to D49=2CN1B;
C41=1 F $\mu$; R41=30 $\Omega$; R42=150 $\Omega$;
R43=4.7K $\Omega$; R44=91K $\Omega$; R45=4.7K $\Omega$.

Figure 40:
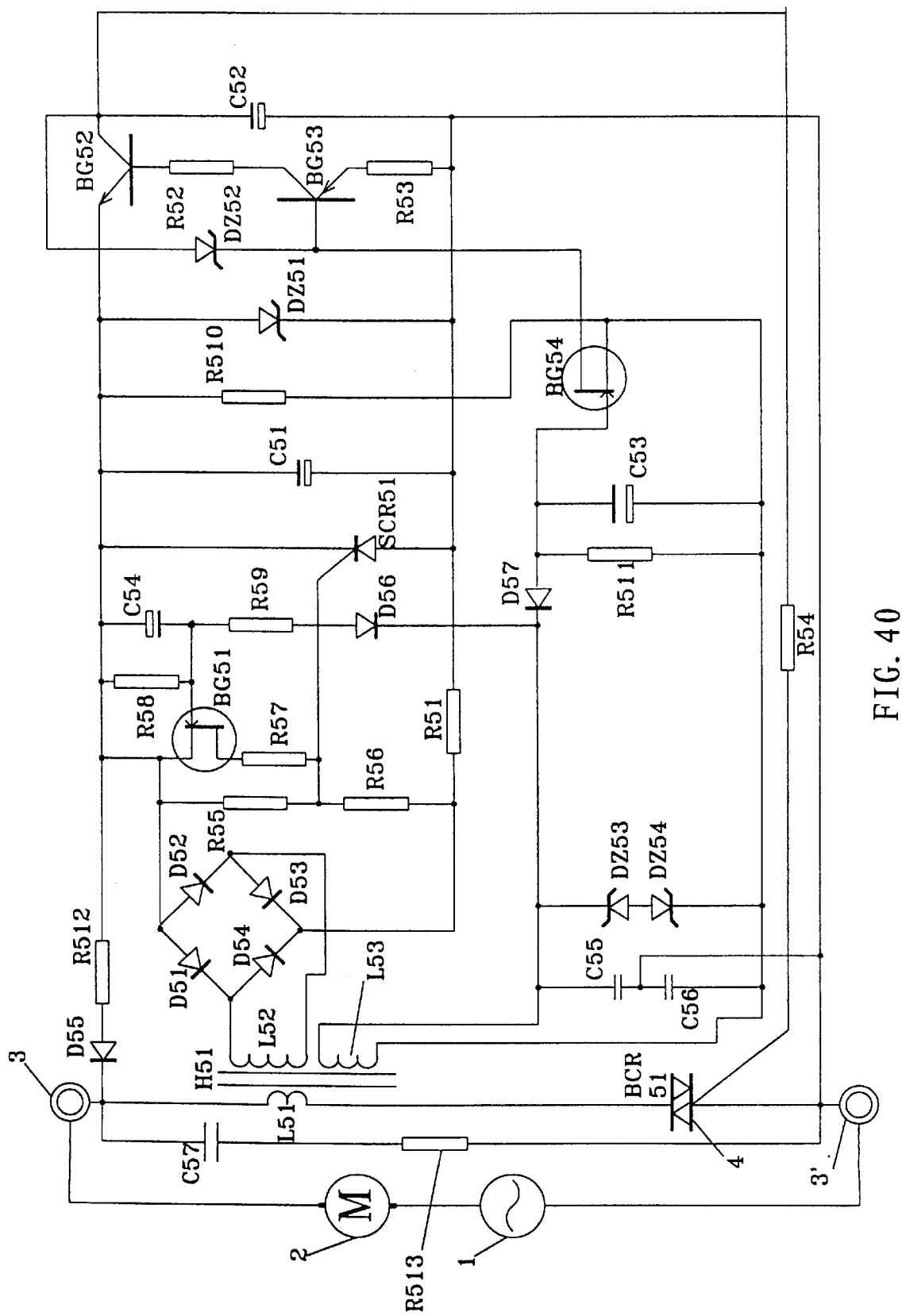

FIG. 40 shows a detailed circuit diagram of third preferred embodiment of second project of this invention. This is a two-wire protection switch used in the compressor motor. The applicable range of the AC power source 1 is 100 volts to 250 volts, 50 hertzs. The load 2 is a 150 watts single-phase compressor motor. The winding L51 and L52 in the mutual inductor H51 corresponding with the winding L4 and L5 in FIG. 14. To set up second secondary winding L53 is necessary to establish a subsidiary regenerated power supply. The diode D5 and the resistor R512 corresponding with the diode D and the resistor R in FIG. 14. The rectifying circuit consists of four diodes D51 to D54. The voltage stabilizing circuit consists of the resistor R51, the Zener diode DZ51 and the capacitor C51. The control circuit consists mainly of the transistor BG51, BG52,BG53, the thyristor SCR51 and their outer periphery elements. The MCBS module uses a form as shown FIG. 1. The functions of the control circuit have short-lived power-off protection, starting overcurrent protection, operating overcurrent protection and automatic reset.

The operating process of this switch shows as follows: after electrifying, the AC power source 1 via the motor M, the diode D55 and the resistor R512 establishes the regenerated power supply at the Zener diode DZ51. This regenerated power supply pours into the base current to the transistor BG53 via the resistor R510 and the source and the drain electrode of the JFET BG54, makes the transistor BG53 and BG52 conduction. After the transistor BG52 is conduction, its collector output voltage via the resistor R54 triggered the thyristor BCR51, thus the thyristor BCR51 conducts on and the motor M is electrified. At present, because the load current exists in the winding L51, the induced voltage across the winding L53 makes the capacitor C53 charged via the diode D57 and makes the capacitor C54 charged via the diode D56, the resistor R59 and R510 so the JFET BG54 turns cut-off rapidly and the JFET BG51 turns cut-off after the starting time of the motor M. On the other hand, the collector voltage of the transistor BG52 pours into the base current to the transistor BG53 via the Zener diode DZ52 so the transistor BG52 and BG53 keep up conduction in spite of the JFET BG54 has turned cut-off. If the AC power source 1 is short-lived power-off since then and is electrified again, the transistor BG53 and BG52 can not conduction and the motor M will be off because the JFET BG54 is cut-off. At the same time, the induced voltage across the winding L53 disappears and the capacitor C53 discharges via the resistor R511, after about five minutes, the voltage across the capacitor C53 decreases to the open voltage of the JFET BG54; because the JFET BG54 becomes conduction, if the AC power source 1 is already electrified at present or will be electrified later, the thyristor BCR51 will be conduction and the load 2 is electrified. The feature of this short-lived power-off protection is that it does not happen delay cut-in when the AC power source is first-time cut-in or is electrified again after the power-off time exceeds five minutes. After the motor M started, the JFET BG51 is cut-off, if the operating current of the motor M exceeds the rating, the output voltage of the rectifying circuit will increase and makes the thyristor SCR51 is turned on via the voltage divider R55 and R56, thus the regenerated power supply will be short-circuited so that the transistor BG52 and the thyristor BCR51 is cut-off and the motor M will be turned off. Later, the automatic reset is similar to the automatic cut-in of the short-lived power-off protection, i.e., the capacitor C53 discharges, the JFET BG54 conducts, thus the transistor BG52 and the thyristor BCR51 is conduction and the motor M is turned on. Although the starting current is greater than the operating current when the motor M started, the operation overcurrent protection does not act, because the JFET BG51 is conduction at this time, so its drain-source resistance and the resistor R57 form in series and then in parallel with the resistor R55, hence to reduce the trigger current and voltage of the thyristor SCR51; therefore, so long as to elect suitable value of the resistor R57, R59 and the capacitor C54, it is sure that the thyristor SCR51 does not conduct when normal starting current and time; however the thyristor SCR51 will conduct and the motor M turned off when the starting current is overdone or the motor M can not start. Because later automatic reset is the same with the reset of the operation overcurrent protection, it is no longer narrated.

In FIG. 40, datum of the elements show as follow:
H51 Piece of Core
XE6-D310-0.2-B SJ97-65 (Thickness 12.5 m/m)
XI6-D310-0.2-B SJ97-65 (Thickness 12.5 m/m)

| Winding | Turns | Wire outer diameter (m/m) |
| --- | --- | --- |
| L51 | 50 | 0.50 |
| L52 | 900 | 0.13 |
| L53 | 450 | 0.08 |

BCR51=TLC386A; SCR51=CR02AM-1;
BG51=3DJ91; BG52=9013;
BG53=9012; BG54=3DJ9I;
D51 to D54=1N4001; D55=1N4007;
D56, D57=1N4001; DZ51=2CW54;
DZ52, DZ53, DZ54=2CW51; C51=22 $\mu$F;
C52=1 $\mu$F; C53=220 $\mu$F; C54=10 $\mu$F;
C55 to C57=0.1 $\mu$F; R51=30 $\Omega$;
R52=3.6K $\Omega$; R53=2K $\Omega$; R54=150 $\Omega$;
R55=5.6K $\Omega$; R56=120K $\Omega$; R57=1K $\Omega$;
R58=1M $\Omega$; R59=220K $\Omega$; R510=22K $\Omega$;
R511=510K $\Omega$; R512=11K $\Omega$; R513=100 $\Omega$.

Figure 41:
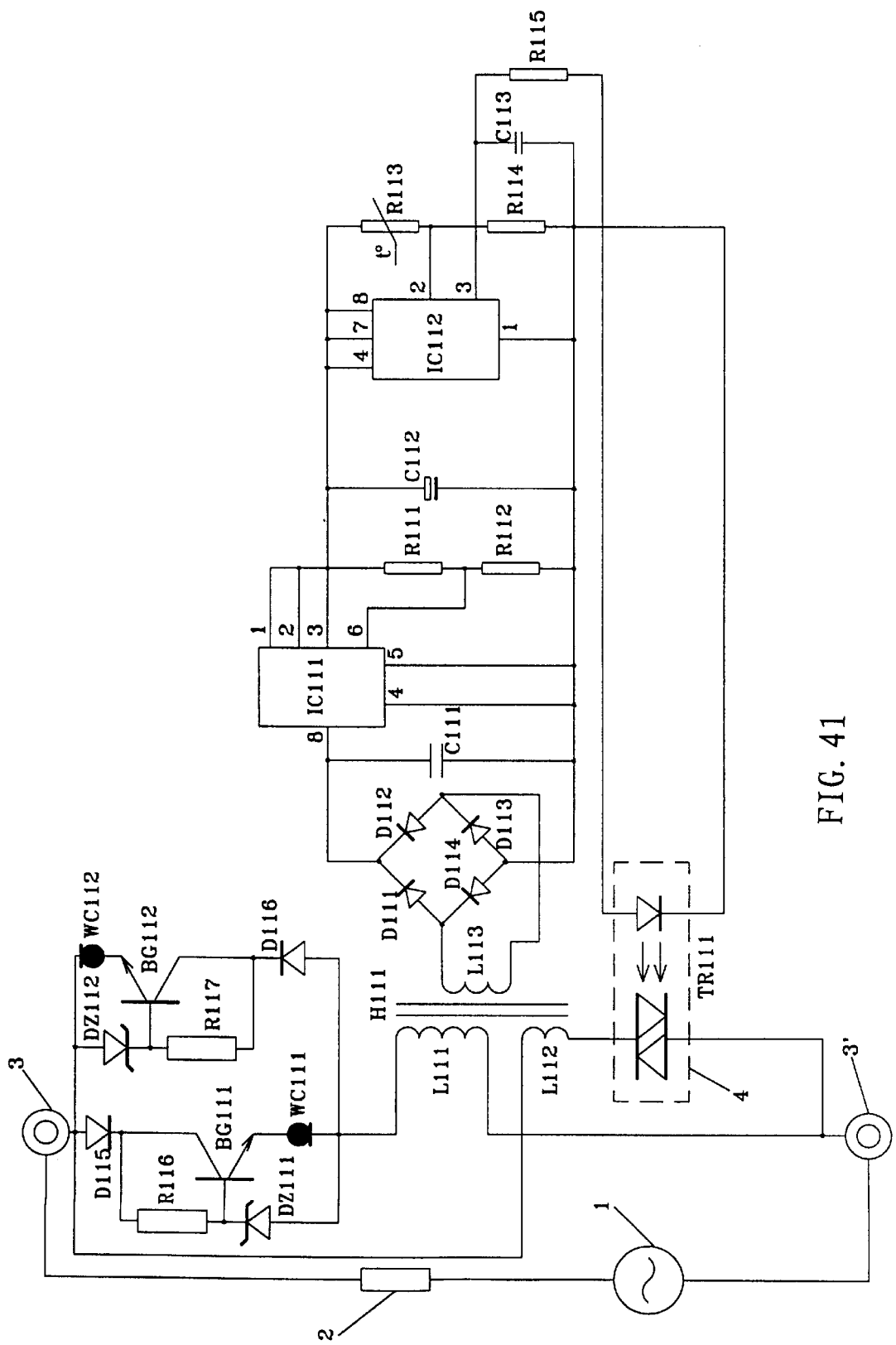
FIG. 41 and FIG. 42 show the detailed circuit diagrams of two preferred embodiments of third project of this invention.

FIG. 41 shows a detailed circuit diagram of first preferred embodiment of third project of this invention. This is a two-wire temperature control switch. The load is a heater, the load current is 1 ampere. Because the current stabilizing component is used, the applicable range of the AC power source 1 is 25 volts to 220 volts, 50 hertzs The mutual inductor H111 corresponding with the mutual inductor H1 in FIG. 15. The bidirectional current stabilizing component consists of the transistor BG111, BG112, the diode D115, D116, the current regulator diode WC111, WC112, the Zener diode DZ111, DZ112, the resistor R116 and R17. The MCBS module uses a form as shown in FIG. 3. Except for substituting the bidirectional stabilizing current component for the capacitor C11 in FIG. 34, other circuit configuration and temperature control performance are the same with the circuit in FIG. 34. The thermistor R113 and R13 are the same also.

Except the thermistor R113, datum of other elements show as follows:
H111 Piece of core
XE6-D310-0.2-B SJ97-65 (Thickness 12.5 m/m)
XI6-D310-0.2-B SJ97-65 (Thickness 12.5 m/m)

| Winding | Turns | Wire outer diameter (m/m) |
| --- | --- | --- |
| L111 | 5500 | 0.03 |
| L112 | 30 | 0.50 |
| L113 | 1000 | 0.13 |

IC111=CW7663; IC112=LM555;
TR111=SP1110; D111 to D114=1N4001;
D115=D116=1N4007; BG111=BG112=3DA87H;
WC111=WC112=3DH114; DZ111=DZ112=2CW53;
C111=0.047 μF; C112=22 μF; C113=0.01 μF;
R111=300K Ω; R112=100K Ω; R114=15K Ω;
R115=300 Ω; R116=R117=120K Ω.

Figure 42:
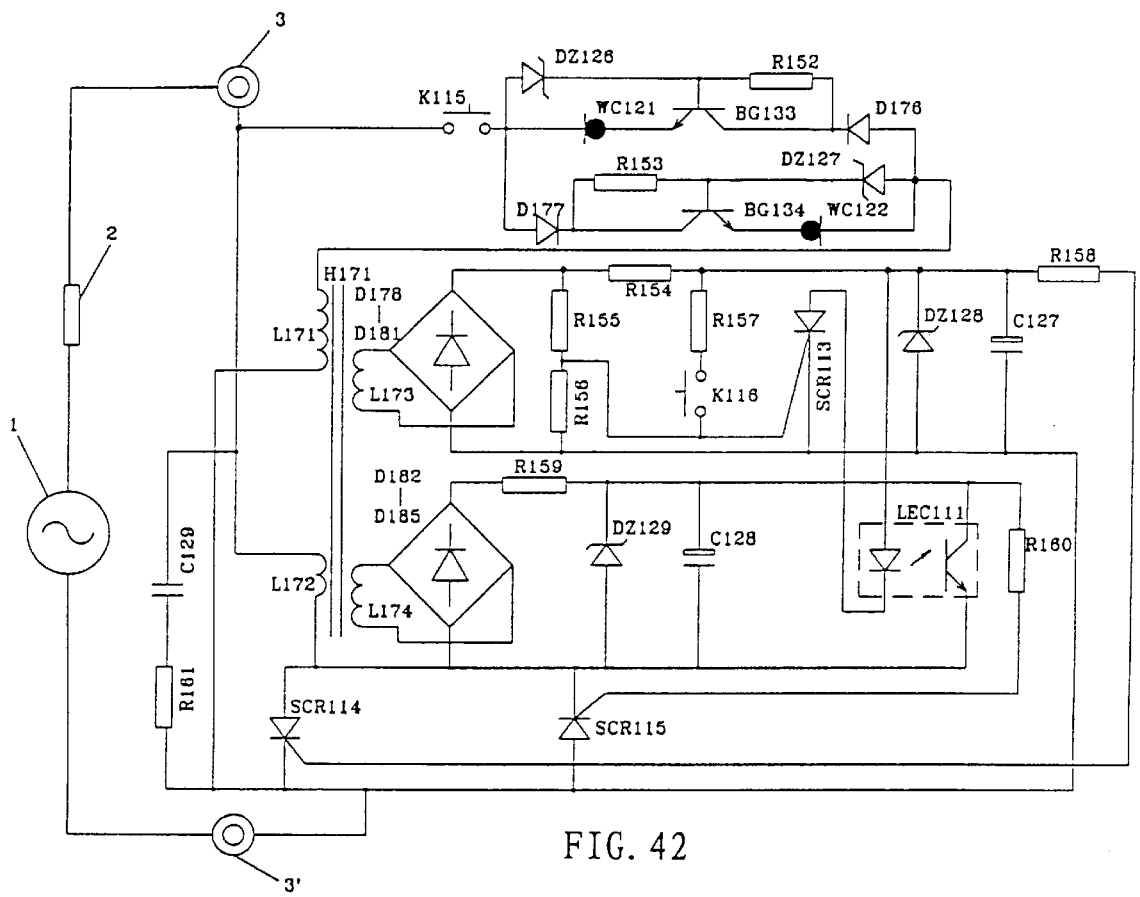

FIG. 42 shows a detailed circuit diagram of second preferred embodiment of third project of this invention. This is a two-wire protection switch using two buttons control on-off. The MCBS module uses a form as shown FIG. 11, therefore, circuit configuration of this switch belongs to a form in FIG. 33. The applicable range of the AC power source 1 is 25 volts to 220 volts. The applicable range of the load current is 0.5 ampere to 2 amperes. Concrete operating process shows as follows: after the button K115 pushed down, two regenerated power supplies which are established at the same time make the thyristor SCR114 and SCR115 conduction together and the load 2 is turned on. Two regenerated power supplies are maintained to rely on the load current in winding L171 later, thus the button K115 need not push down. When push down the button K116 or the load current exceeds 2 amperes, the thyristor SCR113 and photoelectric coupler LEC111 conduct on so that the thyristor SCR114 and SCR115 are cut-off and the load 2 is turned off.

In FIG. 42, datum of the elements show as follows:
H171 Piece of core
XE6-D310-0.2-B SJ97-65 (Thickness 10 m/m)
XI6-D310-0.2-B SJ97-65 (Thickness 10 m/m)

| Winding | Turns | Wire outer diameter (m/m) |
| --- | --- | --- |
| L171 | 2500 | 0.03 |
| L172 | 30 | 0.50 |
| L173 | 500 | 0.13 |
| L174 | 500 | 0.13 |

SCR113=CR02AM-1; SCR114=SCR115=CR3CM-12;
BG133=BG134=3DA87H; LEC111=CD-10;
WC121=WC122=3DH115; D176=D177=1N4007;
D178 to D185=1N4001; DZ126 to DZ129=2CW55;
C127=C128=1 μF; C129=0.1 μF;
R152=R153=100K Ω; R154=R159=510 Ω;
R155=120K Ω; R156=R157=6.2K Ω;
R158=R160=20K Ω; R161=100 Ω.

Figure 43:
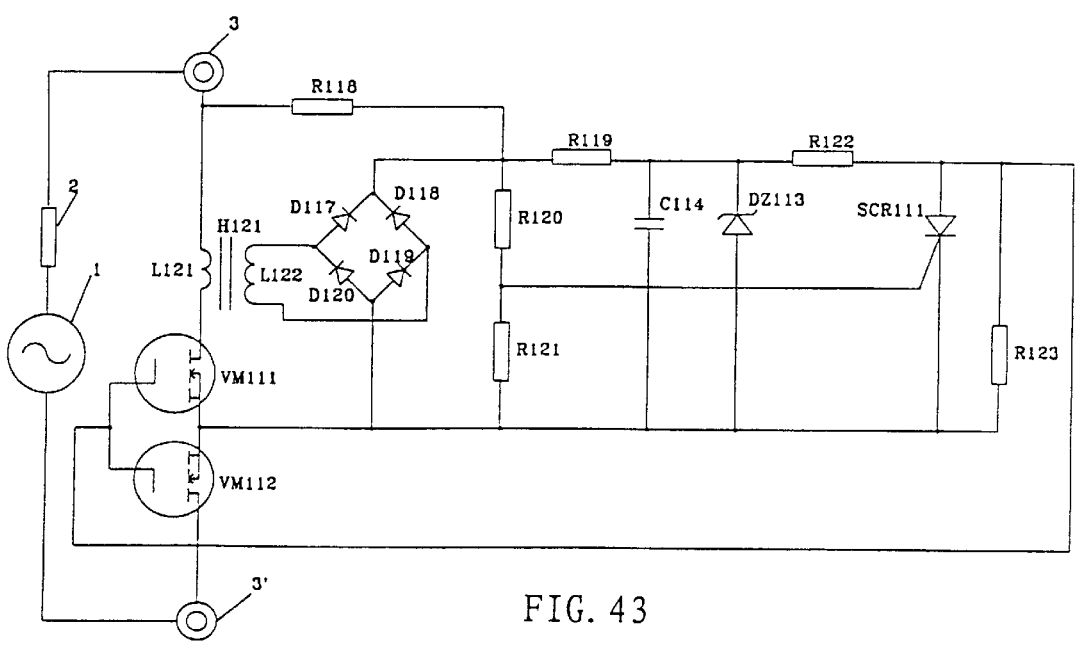
FIG. 43 and FIG. 44 show the detailed circuit diagrams of two preferred embodiments of fourth project of this invention.

FIG. 43 shows a detailed circuit diagram of first preferred embodiment of fourth project of this invention. This is an AC two-wire short-circuit and overload protection switch with automatic reset. The mutual inductor H121 corresponding with the mutual inductor H2 in FIG. 16. The resistor R118 corresponding with the resistor R in FIG. 16. The rectifying circuit consists of four diodes D117 to D120. The voltage stabilizing circuit consists of the resistor R119, the Zener diode DZ113 and the capacitor C114. The control circuit consists of the resistor R120, R121,R122,R123 and the thyristor SCR111. The applicable range of the AC power source 1 is 100 volts to 220 volts, 50 hertzs. The applicable range of the load current is 50 milliamperes to 2.5 amperes. The additional on-state voltage-drop is 0.7 volt when the load current is 2 amperes. The MCBS module uses a form as shown FIG. 4.

When this protection switch is in normal work state, the unidirectional thyristor SCR111 is cut-off, the VMOS FET VM111 and VM112 forward conduct or reverse conduct alternatively for completing the AC passage of the main circuit. When the load 2 is short-circuited or the load current exceeds 2.5 amperes, the output voltage of the rectifying circuit increases so the thyristor SCR111 conducts and the regenerated power supply is short-circuited, thus VMOS FET VM111 and VM112 is cut-off and the load 2 is turned off. Hereafter, when the half-period which the terminal 3 potential is higher than the terminal 3', this switch is turned on in several microseconds to ten odd microseconds for short-circuit or in tens microseconds to several milliseconds for overload. Therefore, after the causing reason of short-circuit or overload is eliminated, this switch can automatic reset rapidly, reset time is less than 20 milliseconds.

Moreover, this short-circuit protection has three features: the first is that either the circuit is electrified under the load to be short-circuited or the load is short-circuited when the circuit to be electrified, both have the same efficient protection; the second is that the short-circuit does not bring about the surge to the AC power source and the transmission line because the short-circuit instantaneous current is restricted and the stable current (average value) is very small after the short-circuit, even the short-circuit may be used to control on-off of the load; the third is that the performance of the short-circuit protection is not relative to the power capacity of the AC power source because the protection response time is extreme short compared with the time constant of a electric power system.

In FIG. 43, datum of the elements show as follows:
H121 Piece of core
XE6-D310-0.2-B SJ97-65 (Thickness 10 m/m)
XI6-D310-0.2-B SJ97-65 (Thickness 10 m/m)

| Winding | Turns | Wire outer diameter (m/m) |
| --- | --- | --- |
| L121 | 40 | 0.63 |
| L122 | 2500 | 0.07 |

VM111=VM112=IRF740; SCR111=CR02AM-1;
DZ113=2CW62; D117 to D120=1N4001;
C114=0.33 Fμ; R118=R120=130K Ω;
R119=R122=390 Ω; R121=4.7K Ω;
R123=100K Ω.

Figure 44:
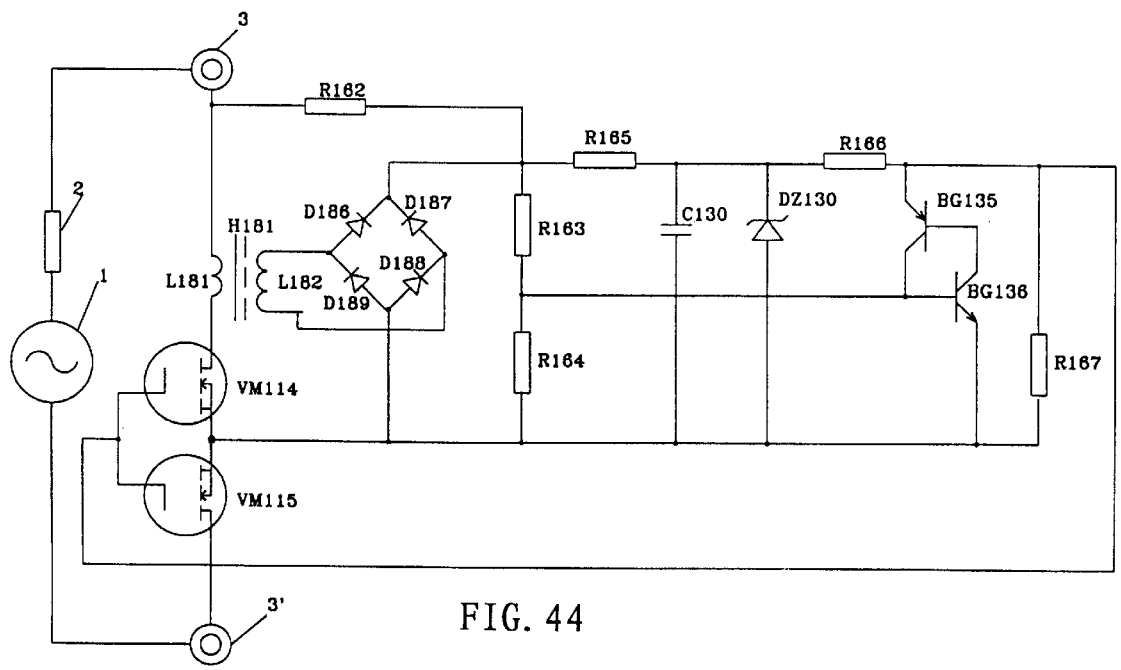

FIG. 44 shows a detailed circuit diagram of second preferred embodiment of fourth project of this invention. This AC two-wire short-circuit and overload protection switch with automatic reset in super-audible frequency. The AC power source 1 is a frequency 50K hertzs, bidirectional square wave, amplitude is 100 volts. The current amplitude of the load 2 is about 1 ampere. Except for substituting the transistor BG135 and BG136 for the thyristor SCR111 in FIG. 43, other circuit configuration is similar to the circuit in FIG. 43 so that protection performance and operating process is similar to the circuit in FIG. 43, but response time and reset time are different.

In FIG. 44, datum of the elements show as follows:
H181 Ferrite circle core (L182 add to metal shield)
Type MX-2000 Standards 10*6*5

| Winding | Turns | Wire outer diameter (m/m) |
|---------|-------|---------------------------|
| L181    | 2     | 0.63                      |
| L182    | 60    | 0.13                      |

VM114=VM115=IRF740; BG135=3CG111;
BG136=9018; D186 to D189=1N4148;
DZ130=2CW62; C130=220PF;
R162=100K Ω; R163=120K Ω; R164=5.6K Ω;
R165=R166=390 Ω; R167=100K Ω.

Figure 45:
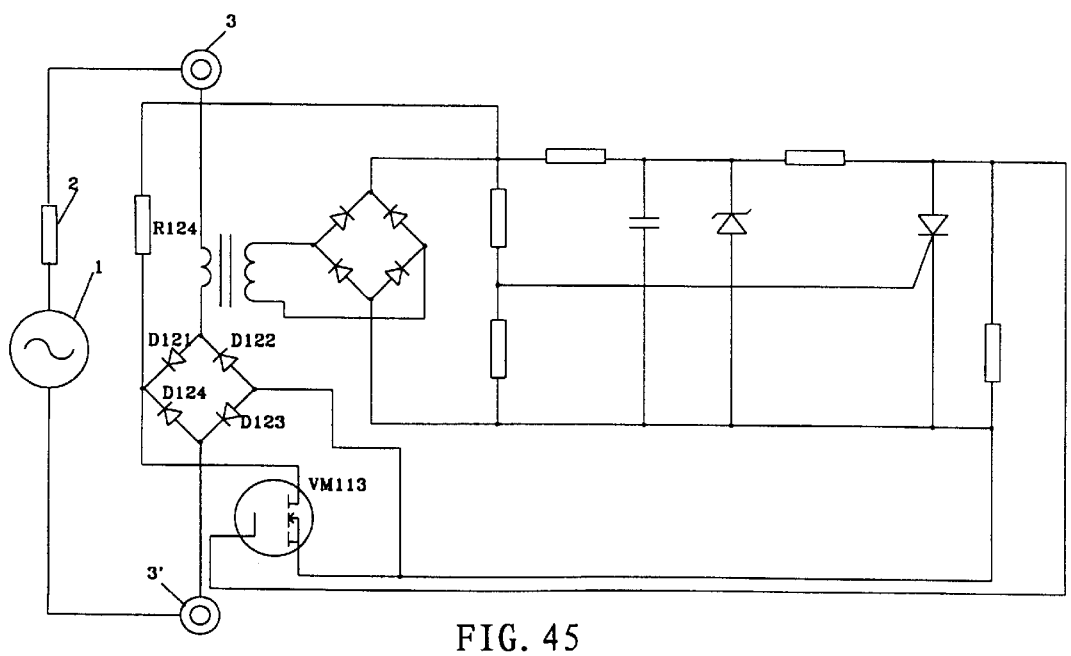
FIG. 45 to FIG. 59 show the detailed circuit diagrams of each preferred embodiment from fifth project to nineteenth project of this invention.

FIG. 45 shows a detailed circuit diagram of a preferred embodiment of fifth project of this invention. This is an AC two-wire short-circuit and overload protection switch with automatic reset. The MCBS module uses a form as shown FIG. 8. The resistor R124 corresponding with the resistor R in FIG. 17. The elements without designation are the same with correspondent elements in FIG. 43, therefore, operating process and use condition are similar to the circuit in FIG. 43 except that there is short-lived cut-in in every half-period after protection action and the reset time is less than 10 milliseconds.

In FIG. 45, datum of the designation elements show as follow:
VM113=IRF740; D121 to D124=1N5404; R124=130K Ω.

Figure 46:
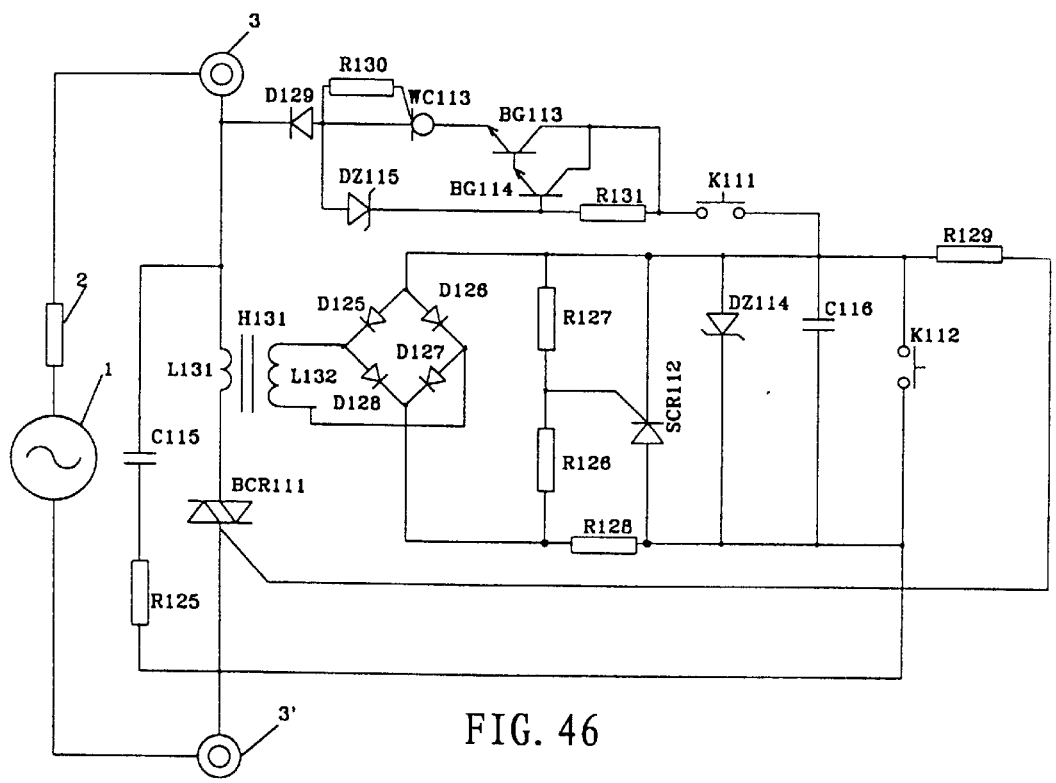

FIG. 46 shows a detailed circuit diagram of a preferred embodiment of sixth project of this invention. This is a two-wire protection switch using two buttons control on-off. Because the current stabilizing component is used, the applicable range of the AC power source 1 is 25 volts to 220 volts, 50 hertzs. The applicable range of the load current is 1 ampere to 3 amperes. The mutual inductor H131 corresponding with the mutual inductor H2 in FIG. 18. The unidirectional current stabilizing component consists of the diode D129, the Zener diode DZ115, the current regulator transistor WC113, two transistors BG113 and BG114, two resistors R130 and R131. The rectifying circuit consists of four diodes D125 to D128. The voltage stabilizing circuit consists of the resistor R128, the Zener diode DZ114 and the capacitor C116. The control circuit consists of two button K111 and K112, three resistor R126, R127, R129 and the thyristor SCR112. The MCBS module uses a form as shown FIG. 1. Except that the main circuit off-state feed circuit and the MCBS module are different to the circuit in FIG. 35, other circuit configuration is similar to the circuit in FIG. 35, therefore, their operating processes are similar, it no longer is narrated repeatedly.

In FIG. 46, datum of the elements shows follows:
H131 Piece of core
XE6-D310-0.2-B SJ97-65 (Thickness 10 m/m)
XI6-D310-0.2-B SJ97-65 (Thickness 10 m/m)

| Winding | Turns | Wire outer diameter (m/m) |
|---------|-------|---------------------------|
| L131    | 40    | 0.63                      |
| L132    | 800   | 0.13                      |

BCR111=TLC386A; SCR112=CR02AM-1;
BG113=D1571; BG114=3DA87H;
WC113=3DH010; DZ114=2CW54;
DZ115=2CW60; D125 to D128=1N4001;
D129=1N4007; C115=0.1 μF;
C116=22 μF; R125=100 Ω;
R126=91K Ω; R127=4.7K Ω;
R128=30 Ω; R129=150 Ω;
R130=390 Ω; R131=100K Ω.

Figure 47:
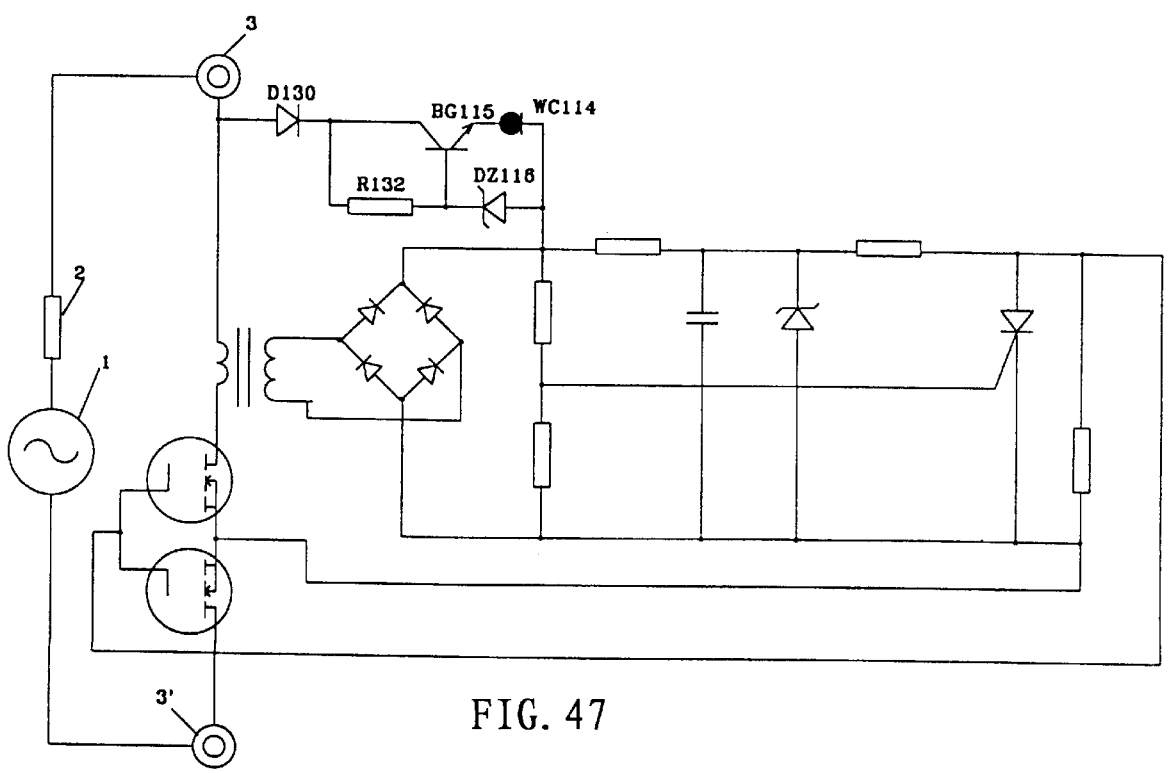

FIG. 47 shows a detailed circuit diagram of a preferred embodiment of seventh project of this invention. This is an AC two-wire short-circuit and overload protection switch with automatic reset. The unidirectional current stabilizing component consists of the transistor BG115, the current regulator diode WC114, the diode D130, the Zener diode DZ116 and the resistor R132. Expect for substituting the unidirectional current stabilizing component for the resistor R118 in FIG. 43, other circuit configuration is the same with the circuit in FIG. 43. Because the current stabilizing component is used, the applicable range of the AC power source 1 is 25 volts to 220 volts. Operating process and protection performance and other use condition are the same with the circuit in FIG. 43. The elements without designation are the same with correspondent elements in FIG. 43.

In FIG. 47, datum of the designation elements snow as follows:
BG115=3DA87H; WC114=3DH010; D310=1N4007;
DZ116=2CW53; R132=100K Ω.

Figure 48:
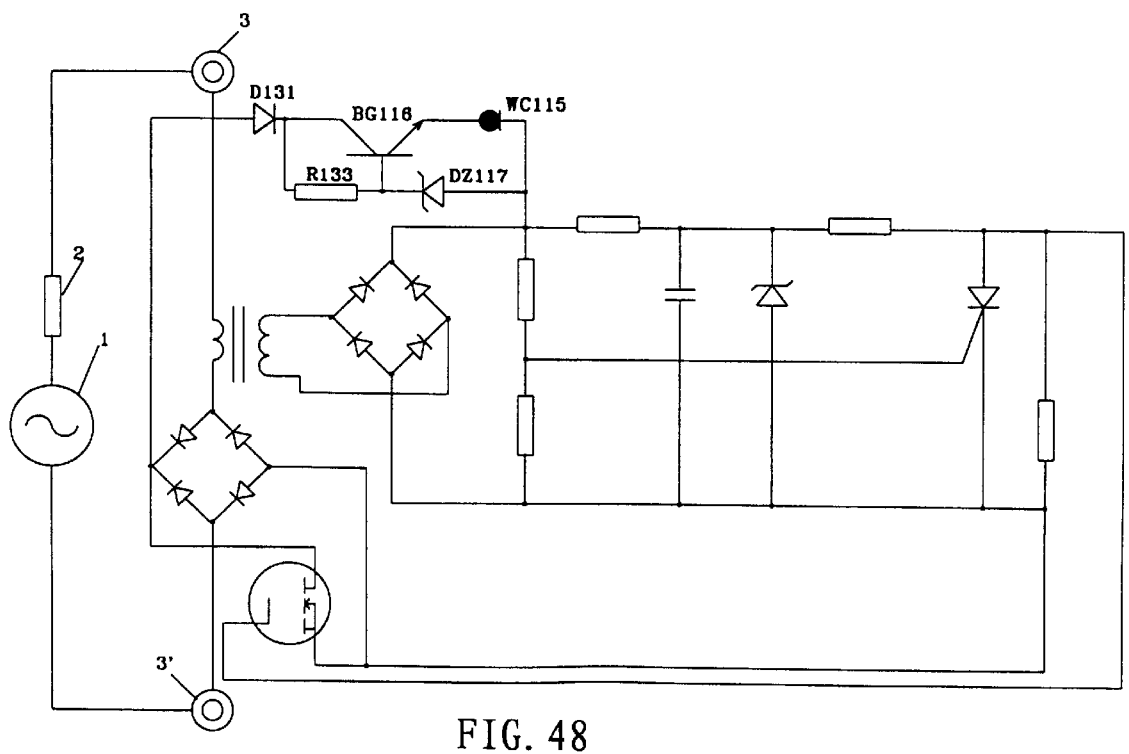

FIG. 48 shows a detailed circuit diagram of a preferred embodiment of eighth project of this invention. This is an AC two-wire short-circuit and overload protection switch with automatic reset. The unidirectional current stabilizing component consists of the transistor BG116, the current regulator diode WC115, the diode D130, the Zener diode DZ116 and the resistor R133. Except for substituting the unidirectional current stabilizing component for the resistor R124 in FIG. 45, other circuit configuration is the same with the circuit in FIG. 45. Because the current stabilizing component is used, the applicable range of the AC power source 1 is 25 volts to 220 volts. Operating process and protection performance and other use condition are the same with the circuit in FIG. 45. The elements without designation are the same with correspondent elements in FIG. 45.

In FIG. 48, datum of the designation elements show as follows:
BG116=3DA87H; DZ116=2CW53; WC115=3DH110;
D131=1N4007; R132=100K Ω.

Figure 49:
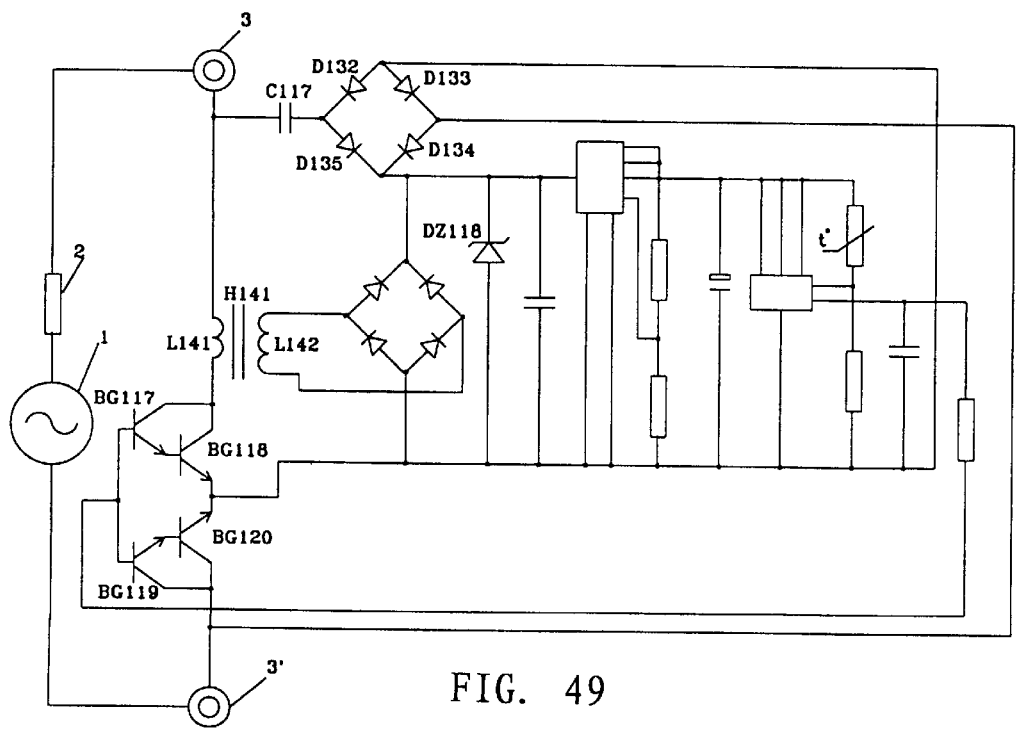

FIG. 49 shows a detailed circuit diagram of a preferred embodiment of ninth project of this invention. This is a two-wire temperature control switch. The load 2 is a heater, the load current is 1 ampere. The applicable range of the AC power source 1 is 150 volts to 220 volts, 50 hertzs. The mutual inductor H141 corresponding with the mutual inductor H2 in FIG. 21, the capacitor C117 corresponding with the impedance element Z in FIG. 21. Four diodes D132 to D135 corresponding with the bridging rectifying circuit BR in FIG. 21. The MCBS module uses a form as shown FIG. 5.

Except for to add the Zener diode DZ118 at the output terminals of the rectifying circuit, the configuration of the rectifying circuit and the voltage stabilizing circuit and the control circuit are the same with the circuit in FIG. 41, so that the temperature control performance is the same with the circuit in FIG. 41. The elements without designation are the same with correspondent elements in FIG. 41.

In FIG. 49, datum of the designation elements show as follow:
H141 Piece of core
XE6-D310-0.2-B SJ 97-65 (Thickness 10 m/m)
XI6-D310-0.2-B SJ 97-65 (Thickness 10 m/m)

| Winding | Turns | Wire outer diameter (m/m) |
|---|---|---|
| L141 | 40 | 0.50 |
| L142 | 1000 | 0.13 |

BG117=BG119=D1571; BG118=BG120=SDK1300;
D132 to D135=1N4007; DZ118=2CW60;
C117=0.5 μF.

Figure 50:
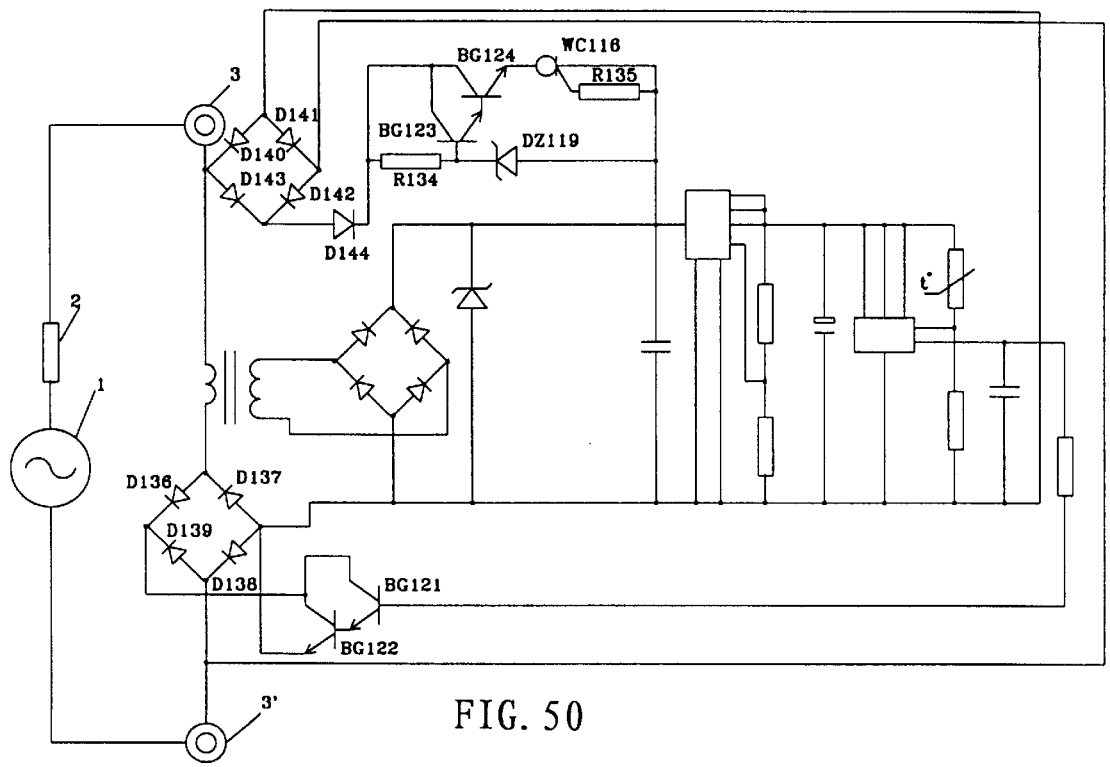

FIG. 50 shows a detailed circuit diagram of a preferred embodiment of tenth project of this invention. This is a two-wire temperature control switch. The unidirectional current stabilizing component consists of two transistors BG123 and BG124, the current regulator transistor WC116, the diode D114, the Zener diode DZ119, two resistors R134 and R135. Four diodes D140 to D143 corresponding with the bridging rectifying circuit BR in FIG. 22. The MCBS module uses a form as shown FIG. 9. Configurations of the rectifying circuit and voltage stabilizing circuit and control circuit are the same with the circuit in FIG. 41 so that the temperature control performance and use condition are same with the circuit in FIG. 41. The elements without designation are the same with correspondent elements in FIG. 41.

In FIG. 50, datum of the designation elements show as follows:
BG121=D1571; BG122=SDK1300; BG123=3DA87H;
BG124=D1571; D136 to D139=1N5404,
D140 to D144=1N4007; WC116=3DH010;
DZ119=2CW60; R134=47K Ω; R135=200 Ω.

Figure 51:
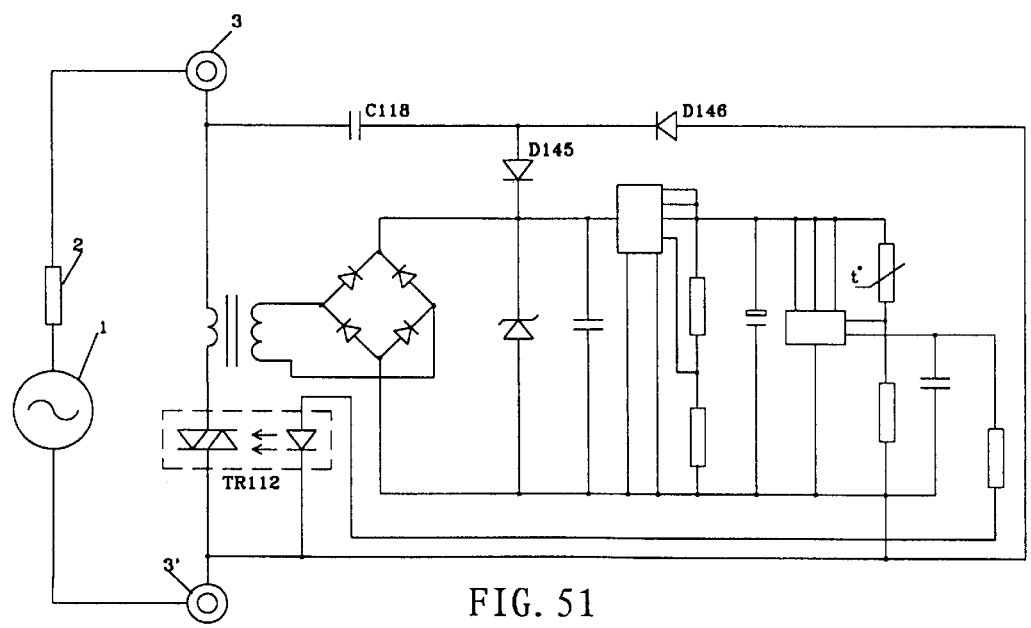

FIG. 51 shows a detailed circuit diagram of a preferred embodiment of eleventh project of this invention. This is a two-wire temperature control switch. The capacitor C118 corresponding with the impedance element Z in FIG. 23. Two diodes D145 and D146 corresponding with the first diode D1 and second diode D2 in FIG. 23. The MCBS module uses a form as shown FIG. 3. Configurations of the rectifying circuit and voltage stabilizing circuit and control circuit are the same with the circuit in FIG. 49, so that the temperature control performance and use condition are the same with the circuit in FIG. 49. The elements without designation are the same with correspondent elements in FIG. 49.

In FIG. 51, datum of the designation elements show as follow:
TR112=SP1110; D145=D146=1N4007; C118=1 μF.

Figure 52:
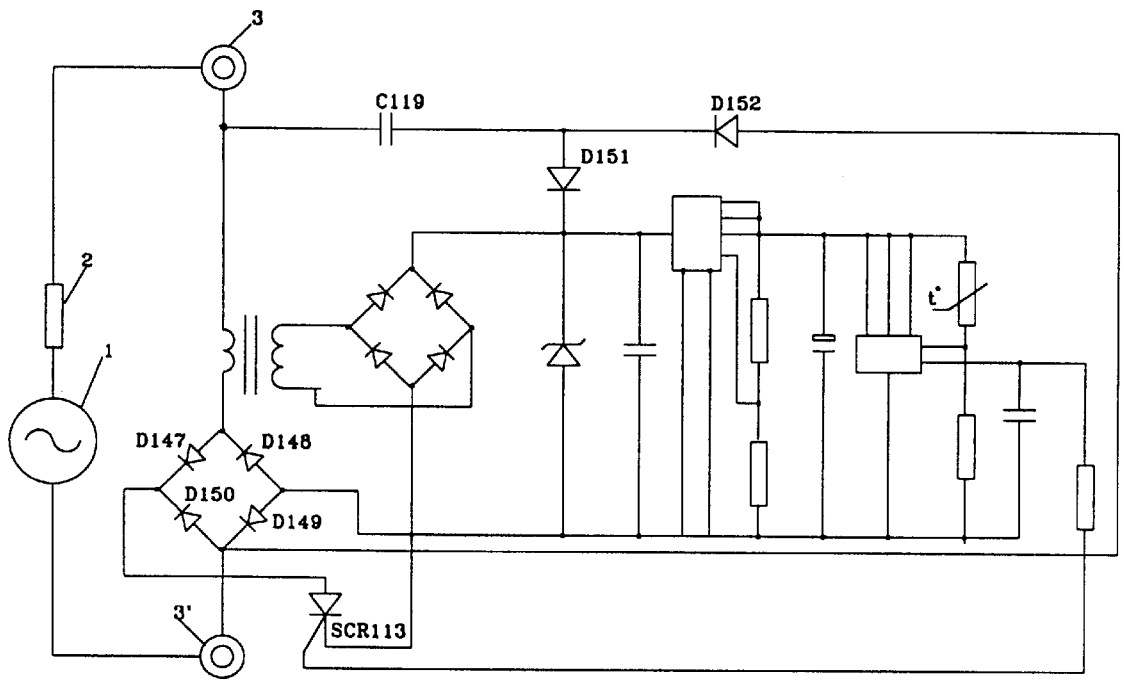

FIG. 52 shows a detailed circuit diagram of a preferred embodiment of twelfth project of this invention. This is a two-wire temperature control switch. The capacitor C119 corresponding with the impedance element Z in FIG. 24. Two diodes D151 and D152 corresponding with first diode D1 and second diode D2 in FIG. 24. The MCBS module uses a form as shown FIG. 7. Configurations of the rectifying circuit and the voltage stabilizing circuit and control circuit are the same with the circuit in FIG. 49, the elements without designation in FIG. 52 are the same with correspondent elements in FIG. 49. The temperature control performance and use condition are the same with the circuit in FIG. 49.

In FIG. 52, datum of the designation elements show as follows:
SCR113=CR3CM-12; D151=D152=1N4007;
D147 to D150=1N5404; C119=1 μF.

Figure 53:
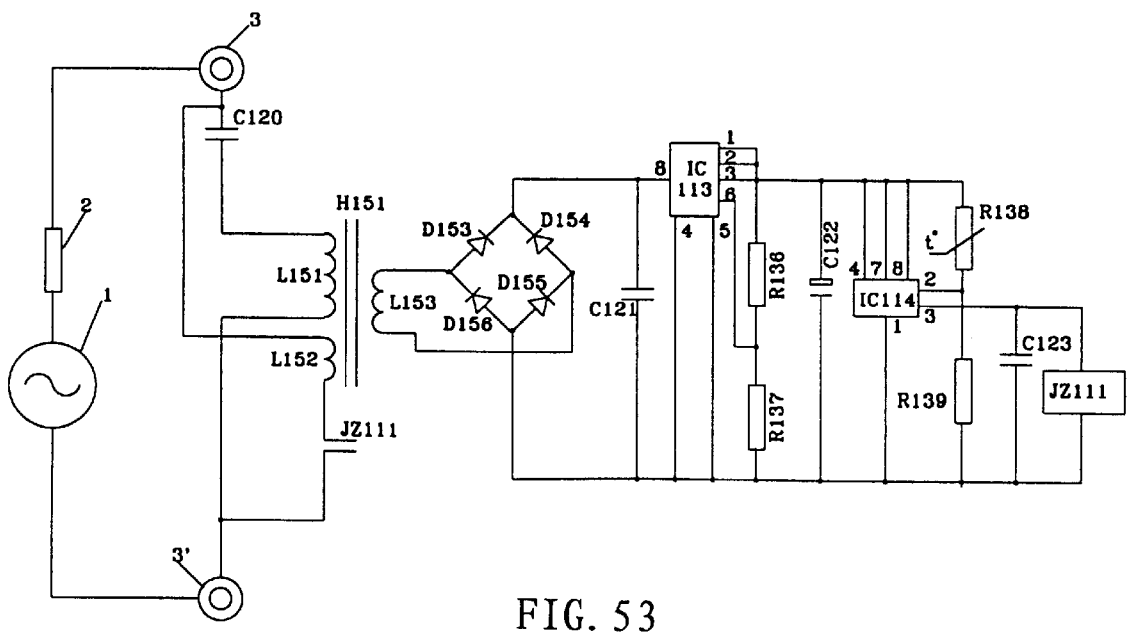

FIG. 53 show a detailed circuit diagram of a preferred embodiment of thirteenth project of this invention. This is a two-wire temperature control contact switch. The load 2 is a heater, the applicable range of load current is 1 ampere to 3 amperes. The applicable range of the AC power source 1 is 150 volts to 250 volts, 50 hertzs. The mutual inductor H151 corresponding with the mutual inductor H1 in FIG. 25. The capacitor C120 corresponding with the impedance element Z in FIG. 25. The MCBS module uses a form a shown FIG. 12. The rectifying and voltage stabilizing circuit consists of four diodes D153 to D156, the integrated circuit IC113 and the outer-periphery elements. The control circuit consists of the integrated circuit IC114 and the outer-periphery elements. The R138 is a gradual change type negative temperature coefficient thermistor. When the cooling resistance value of the thermistor R138 increases to 30 kilo-ohms, third pin of the integrated circuit IC114 becomes high level, thus the normally open contacts of the mechano-electric relay JZ111 closes cut-in and the load 2 is turned on. When the heating resistance value of the thermistor R138 reduces to 7.5 kilo-ohms, third pin of the integrate circuit IC114 is low level, thus the normally open contacts of the mechano-electric relay JZ111 opens cut-off and the load 2 is turned off. The additional on-state voltage-drop of this switch is 0.8 volt when the load current is 1 ampere.

In FIG. 53, except the thermistor R138, datum of other elements show as follows:
H151 Piece of core
XE8-D130-0.2-B SJ 97-65 (Thickness 12.5 m/m )
XI8-D130-0.2-B SJ 97-65 (Thickness 12.5 m/m)

| Winding | Turns | Wire outer diameter (m/m) |
|---|---|---|
| L151 | 5000 | 0.03 |
| L152 | 80 | 0.63 |
| L153 | 1600 | 0.13 |

IC113=CW7663; IC114=LM555;
JZ111=NT73C-510(12VDC); D153 to D156=1N4001;
C120=0.33 μF; C121=0.047 μF; C122=22 μF;
C123=0.01 μF; R136=820K Ω; R137=100K Ω;
R139=15K Ω.

Figure 54:
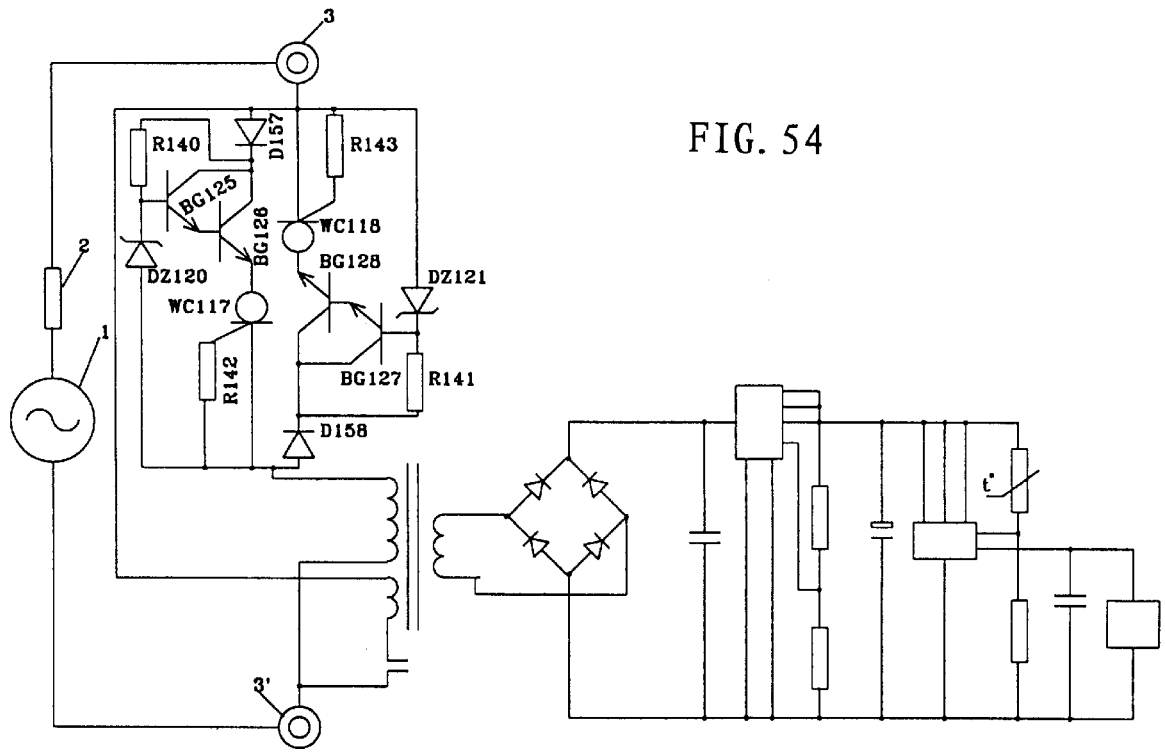

FIG. 54 shows a detailed circuit diagram of a preferred embodiment of fourteenth project of this invention. This is a two-wire temperature control contact switch. In FIG. 54, the designation elements composes a unidirectional current stabilizing component. In circuit configuration, except for substituting the unidirectional current stabilizing component for the capacitor C120, the others are the same with the circuit in FIG. 53. Because the current stabilizing component is used, the applicable range of the AC power source 1 is 25 volts to 250 volts; other use condition and temperature control performance are the same with the circuit in FIG. 53. The elements without designation are the same with correspondent elements in FIG. 53.

In FIG. 54, datum of the designation elements show as follows:
BG125=BG127=3DA87H; BG126=BG128=D1571;
WC117=WC118=3DH010; DZ120=DZ121=2CW60;

D157=D158=1N4007; R140=R141=100K Ω; R142=R143=360 Ω.

Figure 55:
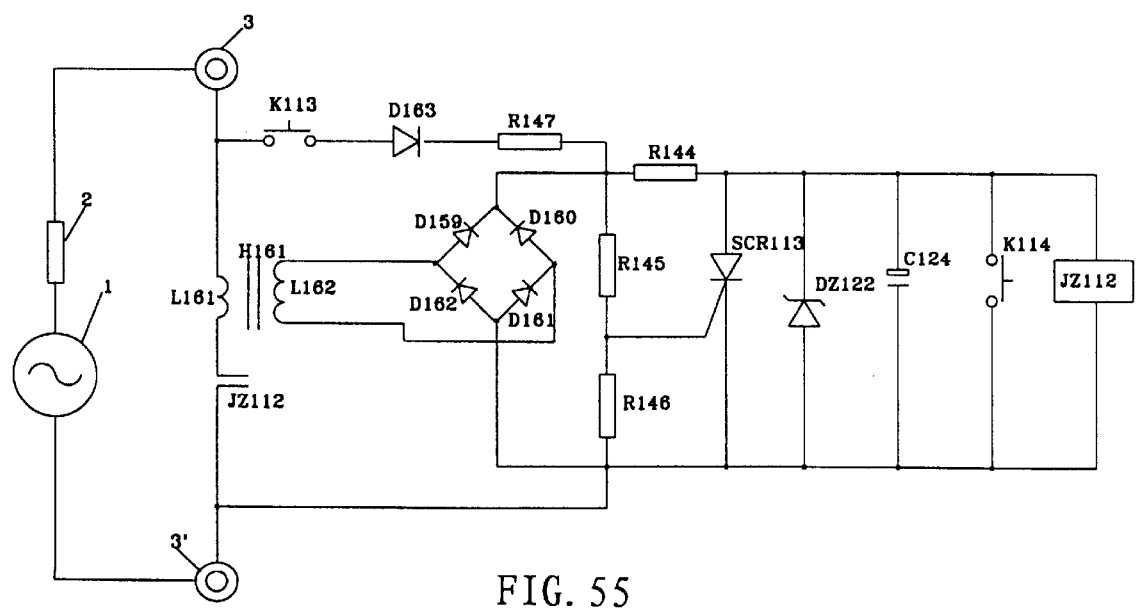

FIG. 55 shows a detailed circuit diagram of a preferred embodiment of fifteenth project of this invention. This is a two-wire protection contact switch using two buttons control on-off. The applicable range of the AC power source 1 is 150 volts to 250 volts, 50 hertzs. The applicable range of the load current is 1 ampere to 3 amperes. The mutual inductor H161 corresponding with the mutual inductor H2 in FIG. 27 The diode D163 and the resistor R147 corresponding with the diode D and resistor R in FIG. 27. The MCBS module uses a form as shown FIG. 12. The rectifying circuit consists of four diodes D159 to D162. The voltage stabilizing circuit consists of the resistor R144, the Zener diode DZ122 and the capacitor C124. The control circuit consists of two button K113, K114, two resistors R145, R146 and the thyristor SCR113. Concrete operating process shows as follows: after the button K113 is pushed down, the regenerated power supply which is established by the AC power source 1, the load 2, the diode D163 and the resistor R147 makes the coil of the mechano-electric relay JZ112 electrifying, thus the normally open contacts of the relay JZ112 closes and the load 2 turned on. Thereafter, the regenerated power supply is maintained to rely on the load current in winding L161, hereupon, the button K113 need not push down. Afterward, only pushed down the button K114, the load 2 can be off. When the load 2 is cut-in, if the load current exceeds 3 amperes, the thyristor SCR113 will be turned on, thus the coil of the relay JZ112 is off and the contacts will open and the load 2 does not electrify. That is overload protection. The additional on-state voltage-drop of this switch is 0.7 volts when the load current is 1 ampere.

In FIG. 55, datum of the elements show as follows:
H161 Piece of core
XE8-D310-0.2-B SJ 97-65 (Thickness 12.5 m/m)
XI8-D310-0.2-B SJ 96-65 (Thickness 12.5 m/m)

| Winding | Turns | Wire outer diameter (m/m) |
| --- | --- | --- |
| L161 | 80 | 0.71 |
| L162 | 1600 | 0.13 |

JZ112=NT73C-510(12VDC); SCR113=CR02AM-1;
D159 to D162=1N4001; D163=1N4007;
DZ122=2CW60; C124=22 μF; R144=51 Ω;
R145=120K Ω; R146=4.7K Ω; R147=3.6K Ω.

Figure 56:
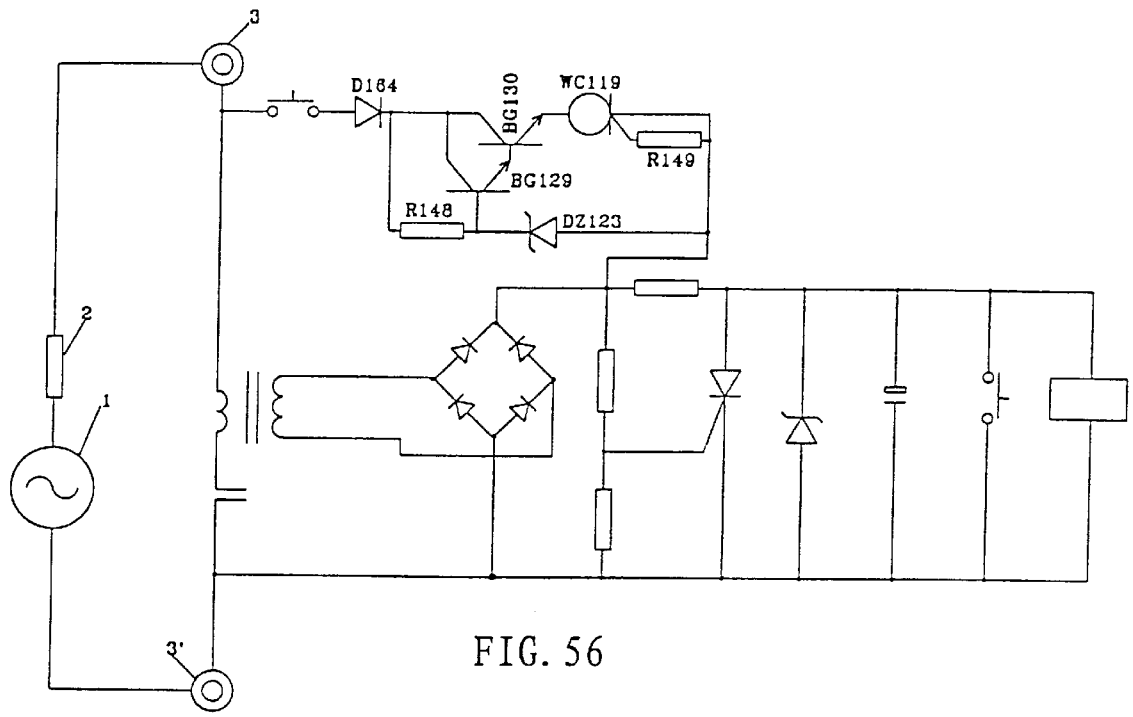

FIG. 56 shows a detailed circuit diagram of a preferred embodiment of sixteenth project of this invention. This is a two-wire protection contact switch using two buttons control on-off. In FIG. 56, the designation elements composes a unidirectional current stabilizing component. In circuit configuration, except for substituting the unidirectional current stabilizing component for the diode D163 and the resistor R147 in FIG. 55, the others are the same with the circuit in FIG. 55. Because the current stabilizing component is used, the applicable range of the AC power source 1 is 25 volts to 250 volts; other use condition and protection performance are the same with the circuit in FIG. 55. The elements without designation are the same with correspondent elements in FIG. 55.

In FIG. 56, datum of the designation elements show as follows:
BG129=3DA87H; BG130=D1571; WC119=3DH030;
DZ123=2CW60; D164=1N4007; R148=47K Ω;
R149=130 Ω.

Figure 57:
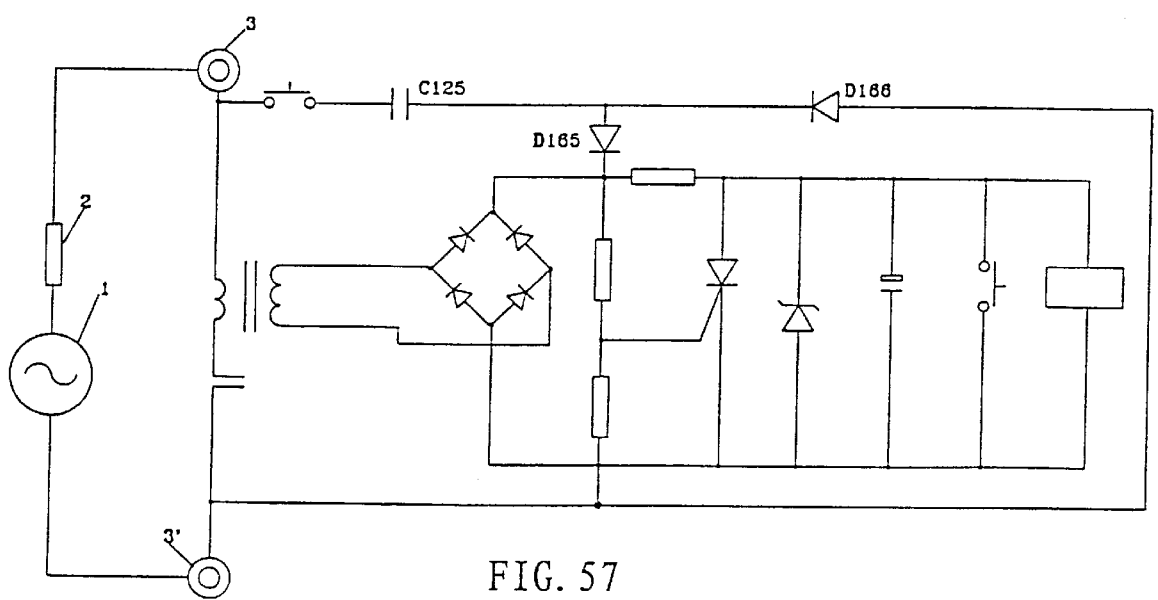

FIG. 57 shows a detailed circuit diagram of a preferred embodiment of seventeenth project of this invention. This is a two-wire protection contact switch using two buttons control on-off. The capacitor C125 corresponding with the impedance element Z in FIG. 29; the diode D165 and D166 corresponding with first diode D1 and second diode D2 in FIG. 29. In circuit configuration, except for substituting the capacitor C125, the diode D165 and D166 for the diode D163 and the resistor R147 in FIG. 55, the others are the same with the circuit in FIG. 55, therefore, protection performance and use condition are the same with the circuit in FIG. 55. The elements without designation are the same with correspondent elements in FIG. 55.

In FIG. 57, datum of designation elements show as follows:
D165=D166=1N4007; C125=1 μF.

Figure 58:
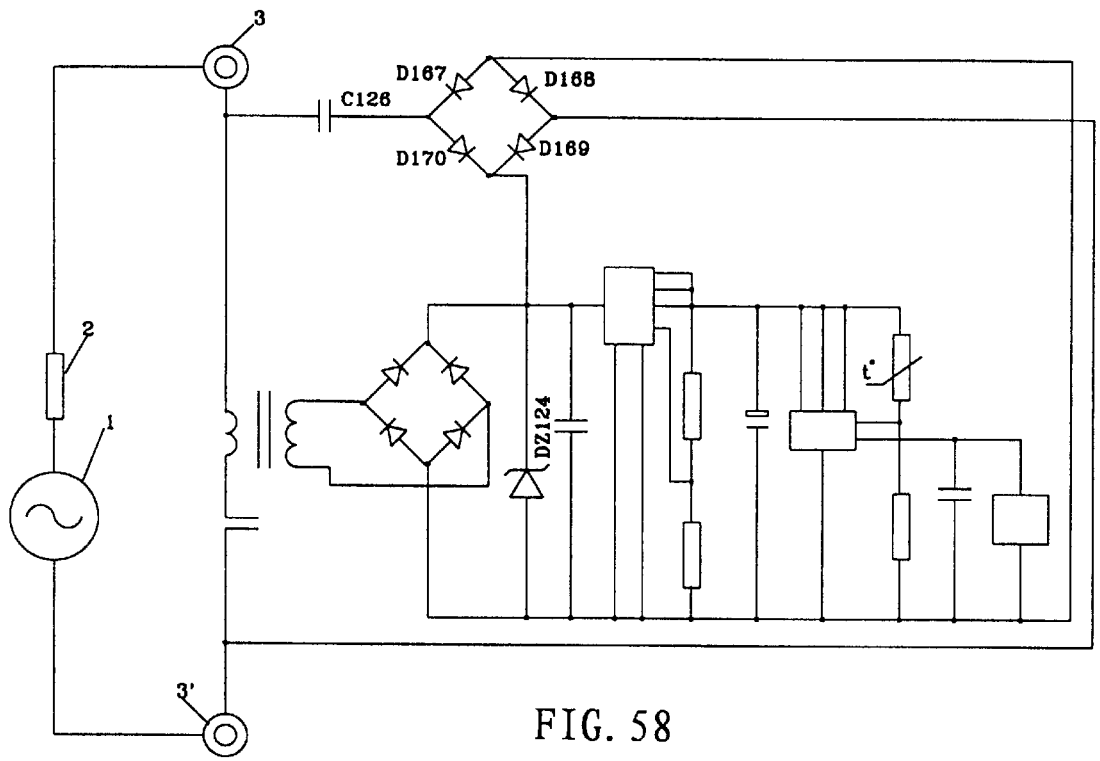

FIG. 58 shows a detailed circuit diagram of a preferred embodiment of eighteenth project of this invention. This is a two-wire temperature control contact switch. In FIG. 58, the mutual inductor is the same with the mutual inductor H161 in FIG. 55, the capacitor C126 corresponding with the impedance element Z in FIG. 30; four diodes D167 to D170 corresponding with the bridging rectifying circuit BR in FIG. 30. In circuit configuration, except for to add the Zener diode DZ124, the rectifying circuit and the voltage stabilizing circuit and the control circuit and the mechano-electric relay of this switch are the same with the circuit in FIG. 53, therefore, temperature performance and use condition are the same with the circuit in FIG. 53. Except for the mutual inductor, the elements without designation are the same with correspondent elements in FIG. 53.

In FIG. 58, datum of the designation elements show as follows:
D167 to D170=1N4007; DZ124=2CW62; C126=1 μF.

Figure 59:
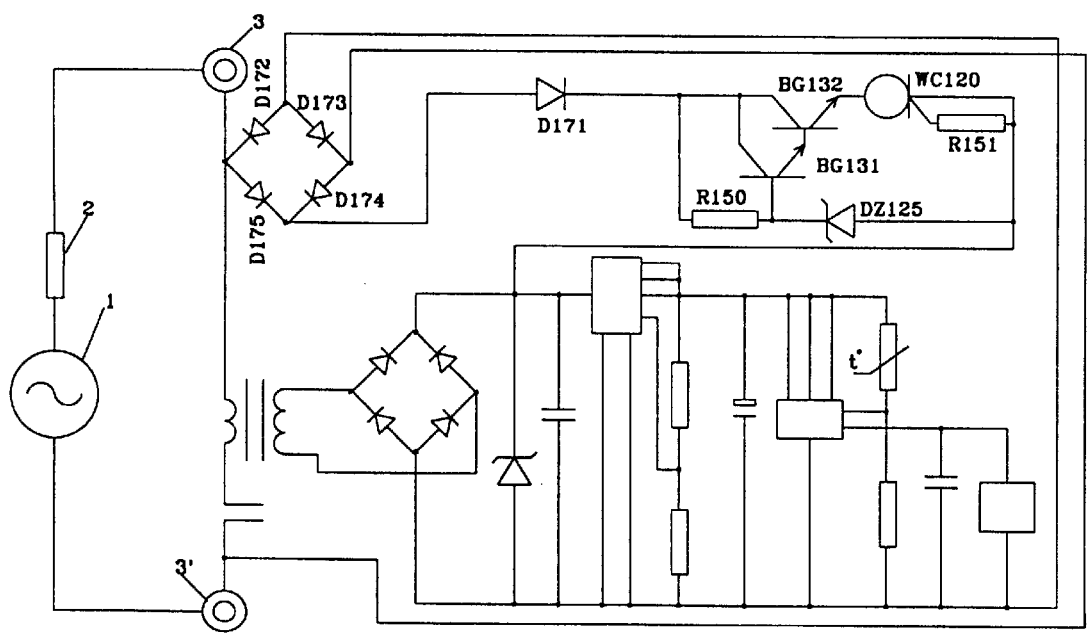

FIG. 59 shows a detailed circuit diagram of a preferred embodiment of nineteenth project of this invention. This is a two-wire temperature control contact switch. In FIG. 59, four diodes D172 to D175 corresponding with the bridging rectifying circuit BR in FIG. 31; the unidirectional current stabilizing component consists of two transistors BG131 and BG132, the current regulator transistor WC120, the diode D171, the Zener diode DZ125, two resistors R150 and R151; the elements without designation are the same with correspondent elements in FIG. 58. Except that the applicable range of the AC power source 1 is 25 volts to 250 volts, other use condition and the temperature control performance of this switch are the same with the circuit in FIG. 58.

In FIG. 59, datum of the designation elements show as follows:
BG131=3DA87H; BG132=D1571; WC120=3DH030;
D171 to D175=1N4007; DZ125=2CW60;
R150=47K Ω; R151=150 Ω.

Figure 60:
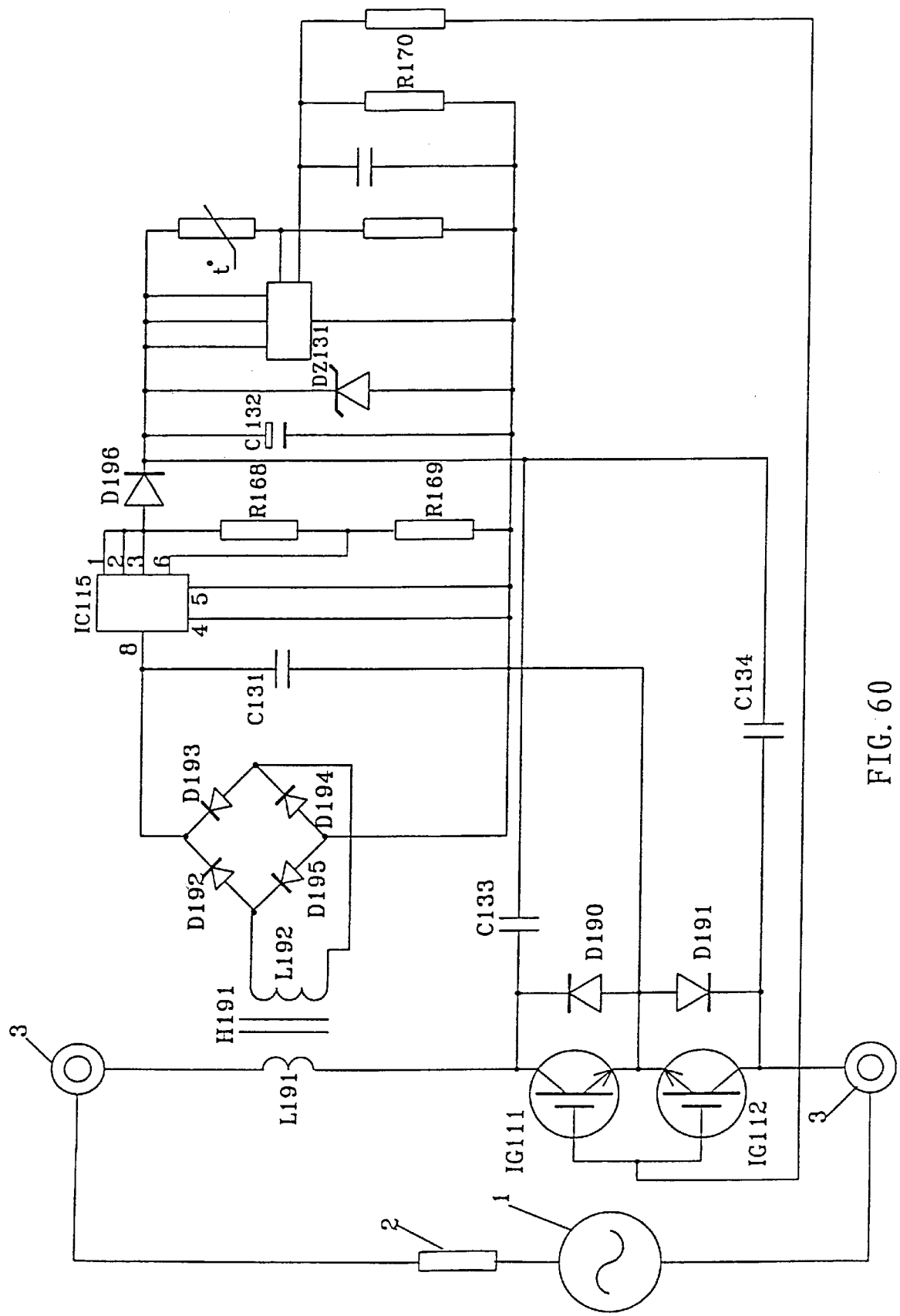
FIG. 60 and FIG. 61 show the detailed circuit diagrams of two preferred embodiments of twentieth project of this invention.

FIG. 60 shows a detailed circuit diagram of first preferred embodiment of twentieth project of this invention. This is a two-wire temperature control switch. The load 2 is a heater. The applicable range of the load current is 1 ampere to 6 amperes. The applicable range of the AC power source 1 is 100 volts to 300 volts, 50 hertzs. In FIG. 60, the mutual inductor H191 corresponding with the mutual inductor H2 in FIG. 32; the capacitor C133 and C134 corresponding with the impedance element Z1 and Z2 in FIG. 32. The MCBS module uses a form as shown FIG. 6. For decreasing reverse voltage-drop of two IGBTs (IG111 and IG112), it has added to two diodes D190 and D191. The rectifying and voltage stabilizing circuit consists of four diodes D192 to D195, the integrated circuit IC115 and the outer-periphery elements. Except for to add the resistor R170, configuration of the control circuit of this switch is the same with the circuit in FIG. 34, therefore, its temperature control performance is the same with the circuit in FIG. 34.

In FIG. 60, datum of the designation elements show as follow:
H191 Piece of core
XE6-D310-0.2-B SJ 97-65 (Thickness 12.5 m/m)
XI6-D310-0.2-B SJ 97-65 (Thickness 12.5 m/m)

| Winding | Turns | Wire outer diameter (m/m) |
|---------|-------|---------------------------|
| L191    | 20    | 0.50                      |
| L192    | 1500  | 0.13                      |

IC115=CW7663; IG111=IG112=GT8Q101;
D190=D191=P600G; D192 to D196=1N4001;
DZ131=2CW60; C131=0.047 $\mu$F;
C132=10 $\mu$F; C133=C134=0.22 $\mu$F;
R168=750K $\Omega$; R169=100K $\Omega$; R170=10K $\Omega$.

Figure 61:
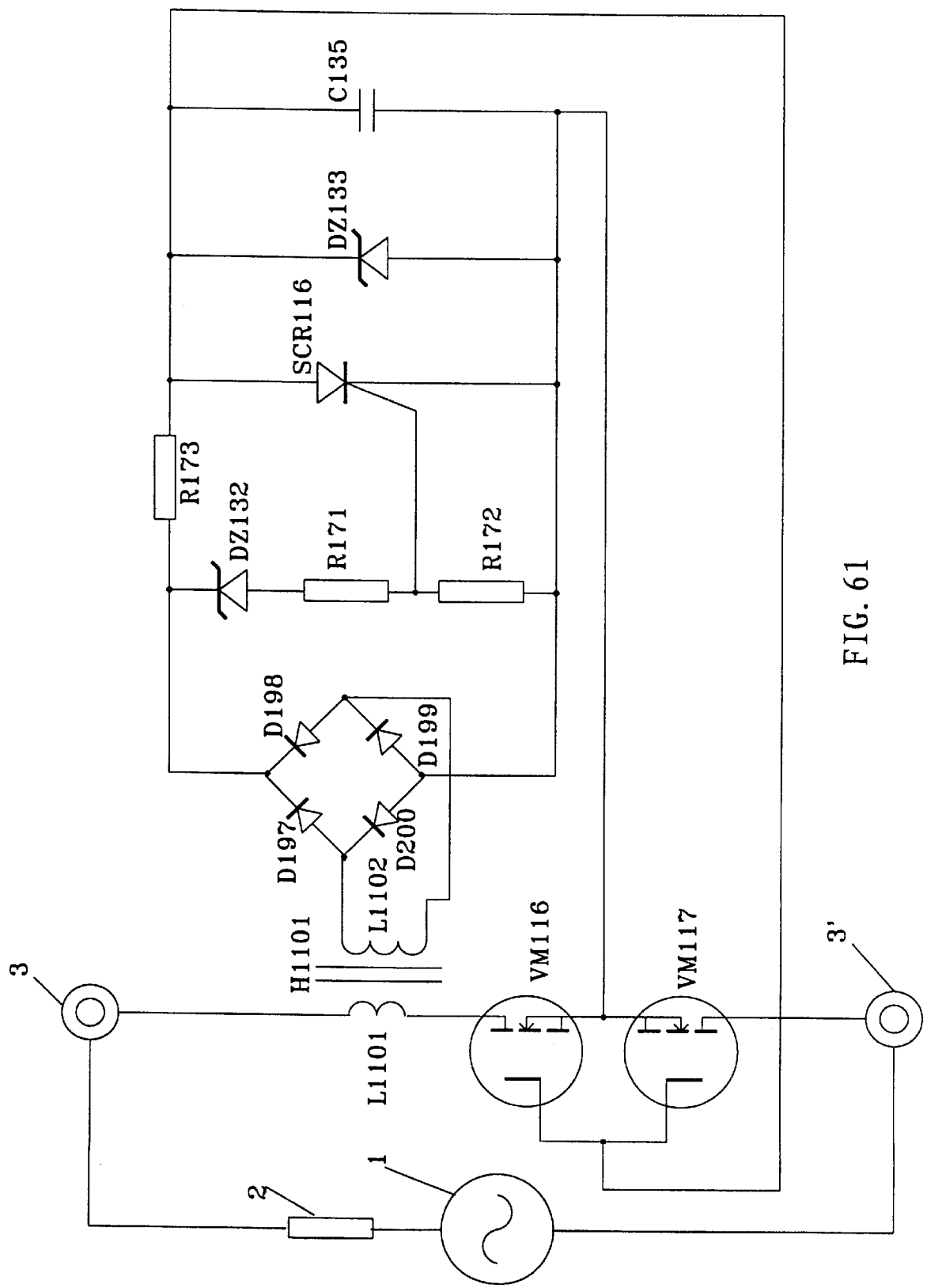

FIG. 61 shows a detailed circuit diagram of second preferred embodiment of twentieth project of this invention. This is an AC two-wire short -circuit and overload protection switch with automatic reset. The mutual inductor H1101 corresponding with the mutual inductor H2 in FIG. 32. The MCBS module uses a form as shown FIG. 4, therein, the internal capacitors between the gate electrode and the drain of two VMOS FETs (VM116 and VM117) corresponding with the impedance element Z1 and Z2 in FIG. 32. The rectifying and voltage stabilizing circuit consists of four diodes D197 to D200, the Zener diode DZ133, the capacitor C135 and the resistor R173. The control circuit consists of the Zener diode DZ132, the thyristor SCR116, two resistors R171 and R172. The applicable range of the AC power source 1 is 30 volts to 220 volts, 50 hertzs. The current applicable range of the load 2 is zero to 5 amperes. The reset time is 0.5 second to 1 second when AC power source 1 is 220 volts. The additional on-state voltage-drop is 0.3 volt when the load current is 5 amperes. Because the reset time is lengthened compared with similar circuits herein above, this protection switch can adapt "slight degree" overload under the inductive load. Except that there is short-lived cut-in every about 0.5 second after protection action and the reset time is different, protection performance of this switch is similar to the circuit in FIG. 43.

In FIG. 61, datum of the elements show as follows:
H1101 Piece of core
XE6-D310-0.2-B SJ 97-65 (Thickness 10 m/m)
XI6-D310-0.2-B SJ 97-65 (Thickness 10 m/m)

| Winding | Turns | Wire outer diameter (m/m) |
|---------|-------|---------------------------|
| L1101   | 12    | 0.85                      |
| L1102   | 5000  | 0.07                      |

VM116=VM117=IRFP360; SCR116=CR02AM-1;
DZ132=DZ133=2CW62; D197 to D200=1N4007;
C135=0.33 $\mu$F; R171=510K $\Omega$;
R172=2K $\Omega$; R173=6.2K $\Omega$.

The said all the embodiments have explained some basic methods to carry out this invention used simple circuit configuration only. Actually, they can be install into various control circuits of lower power consumption, comprising various sensor control circuits, timed circuits, telecontrol circuits even the program control circuits which consists of the programmable controller or the single-chip microcomputer. Therefore, it is intended that those modifications and changes which become obvious to a person skilled in the art as a result of the teachings hereof will be encompassed by the following claims.

What is claimed is:

1. An alternating-current two-wire switch comprising:
a pair of external terminals means being connected to an external active alternating-current circuit with a load and said external terminals means being connected in series with said load;
a main circuit bidirectional switching module means having a first power terminal, a second power terminal and at least a control terminal used for driving said module into cut-in;
a mutual inductor means having a primary winding and a secondary winding;
means for connecting one terminal of the primary winding to the second power terminal and connecting the pair of external terminals respectively to another terminal of the primary winding and first power terminal means the primary winding and said module are connected in series configuration which is connected between the pair of external terminals means to form the operating current in the load passing through the primary winding by the external active alternating-current circuit when the module is driven into cut-in, and the load operating current to be converted into a voltage level suitable appearing across the secondary winding by action of the mutual inductor;
a rectifying circuit means includes a full wave bridge;
means for connecting the secondary winding to the input of the rectifying circuit means to rectify the voltage appearing across the secondary winding into a direct-current voltage appearing across the output of the rectifying circuit;
a direct-current voltage stabilizing circuit means includes a three-terminal direct-current voltage regulator and a energy storage;
means for connecting the output of the rectifying circuit to the input of the direct-current voltage stabilizing circuit means to regulate and filter the direct-current voltage appearing across the output of the rectifying circuit into a relatively constant direct-current voltage appearing across the output of the direct-current voltage stabilizing circuit;
a main circuit off-state feed circuit means being energized at first by the external active alternating-current circuit via the load when the module is cut-off, then means for providing a relatively constant direct-current voltage appearing across the output of the direct-current voltage stabilizing circuit by actions of at least said feed circuit and the direct-current voltage stabilizing circuit;
a control circuit means for providing a control signal;
means for connecting the output of the control circuit to the control terminal of said module means whereby the control signal acts to drive the module into cut-in; and
means for connecting the output of the direct-current voltage stabilizing circuit to the power supply terminals of the control circuit, whereby the control circuit means derives its operating power from the relatively constant direct-current voltage appearing across the output of the direct-current voltage stabilizing circuit whether the module is cut-in or not.

2. The alternating-current two-wire switch of claim 1 wherein the main circuit bidirectional switching module means is a non-contact bidirectional switching device means having a first main terminal, a second main terminal and at least a control terminal used for driving said device into conduction, therein, the first main terminal, the second main terminal and the control terminal of said device means stands for the first power terminal, the second power terminal and the control terminal of said module respectively, said module being cut-in means said device being conduction means there is bidirectional conduction between the first main terminal and the second main terminal, said module being cut-off means said device being no conduction means there is no conduction in either direction between the first main terminal and the second main terminal.

3. The alternating-current two-wire switch of claim 1 wherein the main circuit bidirectional switching module means is a mechano-electric device means having two normally open contacts and a driving coil used for driving the two normally open contacts closing up, therein, the two normally open contacts mean stand for the first power terminal and the second power terminal of said module respectively, one of two terminals of said driving coil means stands for the control terminal of said module, another terminal means being connected to the common bus of the rectifying circuit, the direct-current voltage stabilizing circuit and the control circuit, said module being cut-in means the two normally open contacts closing up and said module being cut-off means said contacts opening.

4. The alternating-current two-wire switch of claim 1 wherein the mutual inductor additionally means having a second primary winding means its self-impedance is very large compared with the primary winding,; said main circuit off-state feed circuit means includes the second primary winding means being connected between said pair of external terminals means a certain current exists in the second primary winding when said module is cut-off means to form a relatively constant voltage appearing across the output of the direct-current voltage stabilizing circuit by actions of the mutual inductor, the rectifying circuit and the direct-current voltage stabilizing circuit.

5. The alternating-current two-wire switch of claim 1 wherein the mutual inductor additionally means having a second primary winding; the main circuit off-state feed circuit means includes the second primary winding and a two-terminal bidirectional current stabilizing component mean being connected in series configuration and being connected between said pair of external terminals means a constant current exists in the second primary winding when said module is cut-off means to form a relatively constant direct-current voltage appearing across the output of the direct-current voltage stabilizing circuit by actions of the mutual inductor, the rectifying circuit and direct-current voltage stabilizing circuit; said two-dimensional bidirectional current stabilizing component means includes two two-terminal unidirectional current stabilizing components which are connected in an inverse-parallel configuration, therein, every two-terminal unidirectional current stabilizing component means includes a current regulator diode used for reference and a transistor used for current amplification.

6. The alternating-current two-wire switch of claim 1 wherein the main circuit off-state feed circuit means includes a resistor in series with a diode means being connected between one of said pair of external terminals and the input terminal of the direct-current voltage stabilizing circuit means to form a relatively constant direct-current voltage appearing across the output of the direct-current voltage stabilizing circuit by the resistor current-listing, the diode rectifying and voltage stabilizing when said module is cut-off.

7. The alternating-current two-wire switch of claim 1 wherein the main circuit off-state feed circuit means includes a impedor, a first diode and a second diode, the impedor in series with the second diode means being connected between the pair of external terminal and the first diode means being connected between the input terminal of the direct-current voltage stabilizing circuit and a connection node of the impedor and the second diode means to form a relatively constant direct-current voltage appearing across the output of the direct-current voltage stabilizing circuit by the impedor current-limiting, said two diodes rectifying and voltage stabilizing when said module is cut-off.

8. The alternating-current two-wire switch of claim 1 wherein the main circuit off-state feed circuit means includes a impedor and a bridge rectifier, one of the input terminals of the bridge rectifier via the impedor means being connected to one of the pair of external terminals, another of the input terminals of the bridge rectifier means being connected to another of the pair of external terminals and two output terminals of the bridge rectifier mean being connected to input of the direct-current voltage stabilizing circuit means to form a relatively constant direct-current voltage appearing across the output of the direct-current voltage stabilizing circuit by the impedor current-limiting, the bridge rectifier rectifying and voltage stabilizing when said module is cut-off.

9. The alternating-current two-wire switch of claim 1 wherein the main circuit off-state feed circuit means includes a bridge rectifier and a two-terminal unidirectional current stabilizing component, two input terminals of the bridge rectifier means being respectively connected to the pair of external terminals and two output terminals of the bridge rectifier via said unidirectional current stabilizing component mean being connected to the input of the direct-current voltage stabilizing circuit means to form a relatively constant direct-current voltage appearing across the output of the direct-current voltage stabilizing circuit by said component current stabilizing, the bridge rectifier rectifying and voltage stabilizing when said module is cut-off; therein, said two-terminal unidirectional current stabilizing component means includes a current regulator diode used for reference and a transistor used for current amplification.

10. The alternating-current two-wire switch of claim 2 wherein the non-contact bidirectional switching device means includes a triac, therein, the first main electrode, the second main electrode and the gate of said triac respectively means stands for the first main terminal, the second main terminal and the control terminal of said device.

11. The alternating-current two-wire switch of claim 2 wherein the non-contact bidirectional switching device additionally means includes a second control terminal means being connected to a common bus of the rectifying circuit, the direct-current voltage stabilizing circuit and the control circuit.

12. The alternating-current two-wire switch of claim 2 wherein the non-contact bidirectional switching device means includes a first thyristor and a second thyristor mean being connected in an inverse-parallel configuration, a connection node of the cathode of the first thyristor and the anode of the second thyristor means is the first main terminal, a connection node of the anode of the first thyristor and the cathode of the second thyristor means is the second main terminal, the gate of the first thyristor means is the control terminal and the gate of the second thyristor means is a second control terminal additionally.

13. The alternating-current two-wire switch of claim 11 wherein the non-contact bidirectional switching device means includes two transistor, their bases (or gates) mean being connected to each other means connection node is the control terminal, their emitters (or sources) mean being connected to each other means connection node is the second control terminal and their collectors (or drains) mean are the first main terminal and the second main terminal respectively.

14. The alternating-current two-wire switch of claim 11 wherein the non-contact bidirectional switching device means includes a bridge rectifier and a transistor (or thyristor), the collector (or drain or anode) and the emitter (or source or cathode) of said transistor (or thyristor) mean being connected between two output terminals of said bridge rectifier, the base (or gate) of said transistor (or thyristor) means is the control terminal, the connection node of the emitter (or source or cathode) means is the second control terminal, the connection node of the collector (or drain or anode) means is called a start terminal and two input terminals of said bridge rectifier mean are the first main terminal and the second main terminal respectively.

15. The alternating-current two-wire switch of claim 11 wherein the main circuit off-state feed circuit means includes a resistor means being connected between one of the pair of external terminals and the input terminal of the direct-current voltage stabilizing circuit means to form a relatively constant direct-current voltage appearing across the output of the direct-current voltage stabilizing circuit by the resistor current-limiting, rectifying of the unidirectional passage between the second control terminal and one external terminal, and voltage stabilizing when the non-contact bidirectional switching device is not conduction.

16. The alternating-current two-wire switch of claim 11 wherein the main circuit off-state feed circuit means includes a two-terminal unidirectional current stabilizing component means being connected between one of the pair of external terminals and the input terminal of the direct-current voltage stabilizing circuit means to form a relatively constant direct-current voltage appearing across the output of the direct-current voltage stabilizing circuit by rectifying of the unidirectional passage between the second control terminal and one external terminal, said component current stabilizing and voltage stabilizing when the non-contact bidirectional switching device is not conduction.

17. The alternating-current two-wire switch of claim 12 additionally means having a second control circuit, a second rectifying circuit and a second direct-current voltage stabilizing circuit which is made up of the same construction as the rectifying circuit and the direct-current voltage stabilizing circuit correspondingly, and wherein the mutual inductor additionally means having a second primary winding and a second secondary winding; the second primary winding means being connected between the pair of external terminals means the second primary winding is used for a main circuit off-state feed circuit, the second secondary winding means being connected to the input of the second rectifying circuit, the output of the second rectifying circuit means being connected to the input of the second direct-current voltage stabilizing circuit and the output of the second direct-current voltage stabilizing circuit means being connected to the power supply terminals of the second control circuit means to form a relatively constant direct-current voltage appearing across the output of the second direct-current voltage stabilizing circuit to be used for the power supply of the second control circuit from a alternating-current voltage level suitable appearing across the second secondary winding by rectifying and voltage stabilizing whether the non-contact bidirectional switching device is conduction or not; the second control circuit means for providing a control signal which is synchronous with the control signal of the control circuit, the output terminal of the second control circuit means being connected to the second control terminal of the non-contact bidirectional switching device, the second main terminal of said device additionally means being connected to the common bus of the second rectifying circuit, the second direct-current voltage stabilizing circuit and second control circuit, and first main terminal of said device additionally means being connected to the common bus of the rectifying circuit, the direct-current voltage stabilizing circuit and the control circuit means two synchronous control signals driving said device into bidirectional conduction.

18. The alternating-current two-wire switch of claim 13 wherein the main circuit off-state feed circuit means includes a first impedor and a second impedor means for connecting one terminal of the first impedor and one terminal of the second impedor respectively to the first main terminal and the second main terminal of the non-contact bidirectional switching device and connecting another terminal of the first impedor and another terminal of the second impedor together to the input terminal of the direct-current voltage stabilizing circuit means to form a relatively constant direct-current voltage appearing across the output of the direct-current voltage stabilizing circuit by said two impedors current-limiting, rectifying of two unidirectional passages between the second control terminal and the pair of external terminals, and voltage stabilizing when said device is not conduction.

19. The alternating-current two-wire switch of claim 14 wherein the main circuit off-state feed circuit means includes a resistor means being connected between the start terminal of the non-contact bidirectional switching device and the input terminal of the direct-current voltage stabilizing circuit means to form a relatively constant direct-current voltage appearing across the output of said stabilizing circuit by the resistor current-limiting, rectifying of the bridge rectifier in said device and voltage stabilizing when said device is not conduction.

20. The alternating-current two-wire switch of claim 14 wherein the main circuit off-state feed circuit means includes a two-terminal unidirectional current stabilizing component means being connected between the start terminal of the non-contact bidirectional switching device and the input terminal of the direct-current voltage stabilizing circuit means to form a relatively constant direct-current voltage appearing across the output of said stabilizing circuit by said component current stabilizing, rectifying of the bridge rectifier in said device and voltage stabilizing when said device is not conduction.

21. The alternating-current two-wire switch of claim 18 wherein the first impedor and the second impedor mean are two electrode capacities of the transistors in said non-contact bidirectional switching device.

\* \* \* \* \*